US012682100B2

(12) United States Patent     (10) Patent No.:   US 12,682,100 B2

Dhumal et al.     (45) Date of Patent:    Jul. 14, 2026

(54) MASKING SENSITIVE DATA ON DETECTING PRESENCE OF NON-AUTHORIZED USER

(71) Applicant: Avaya Inc., Basking Ridge, NJ (US)

(72) Inventors: Pragati Dhumal, Pune (IN); Tanvi Sharma, Pune (IN)

(73) Assignee: Avaya Management L.P., Morristown, NJ (US)

( * ) Notice: Subject to any disclaimer, the term of this patent is extended or adjusted under 35 U.S.C. 154(b) by 19 days.

(21) Appl. No.: 18/816,983

(22) Filed: Aug. 27, 2024

(65) Prior Publication Data

US 2026/0064867 A1     Mar. 5, 2026

(51) Int. Cl.
*G06F 21/62*     (2013.01)

(52) U.S. Cl.
CPC ................................. *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 9,600,688 B2 | 3/2017 | Buck | |
| 10,762,241 B1 * | 9/2020 | Buckingham | H04L 9/0643 |
| 11,706,337 B1 * | 7/2023 | Mitchem | G06F 40/30 |
| | | | 704/270.1 |
| 12,182,302 B1 * | 12/2024 | Haslam | H04W 12/33 |
| 12,243,306 B1 * | 3/2025 | Rothschild | G06V 40/172 |
| 2010/0205667 A1 | 8/2010 | Anderson et al. | |
| 2013/0254874 A1 | 9/2013 | Xu | |
| 2014/0201844 A1 * | 7/2014 | Buck | G06F 21/554 |
| | | | 726/26 |
| 2021/0182430 A1 * | 6/2021 | Negi | G06F 21/6263 |
| 2021/0390215 A1 | 12/2021 | Sangle-Ferriere | |
| 2023/0012801 A1 * | 1/2023 | Dorai | G06N 7/01 |
| 2024/0070251 A1 * | 2/2024 | Maizels | G06F 21/32 |

\* cited by examiner

*Primary Examiner* — Mohammad A Siddiqi

(57)               ABSTRACT

Embodiments provide methods and systems for automatically censoring sensitive data. The methods and systems include receiving information that is to be displayed on a display of a computing device, analyzing the received information based on user security parameters, identifying sensitive data and non-sensitive data from the received information based on the user security parameters and displaying the received information on the display of the computing device. The methods and systems further include obtaining image data depicting a monitored environment in proximity to the display of the computing device, analyzing the image data to identify a detected event in the monitored environment and when the detected event in the monitored environment exceeds a predetermined threshold, censoring regions of the displaying received information where the identified sensitive data was displayed.

16 Claims, 19 Drawing Sheets

300

Shoulder
Surfer

312

Computing Device
304

Camera
316

Screen
334

Information
338

Sensitive Data Protection Module
354

Image Acquisition and Comparison Unit
358

Stored
Images
362

Reference
Images
366

Target
Images
370

Facial Recognition
Unit
392

Image Comparison
Engine
378

User Security
Parameters
374

Notification
Unit
382

Event
Detector
386

Censoring
Unit
390

350

User

308

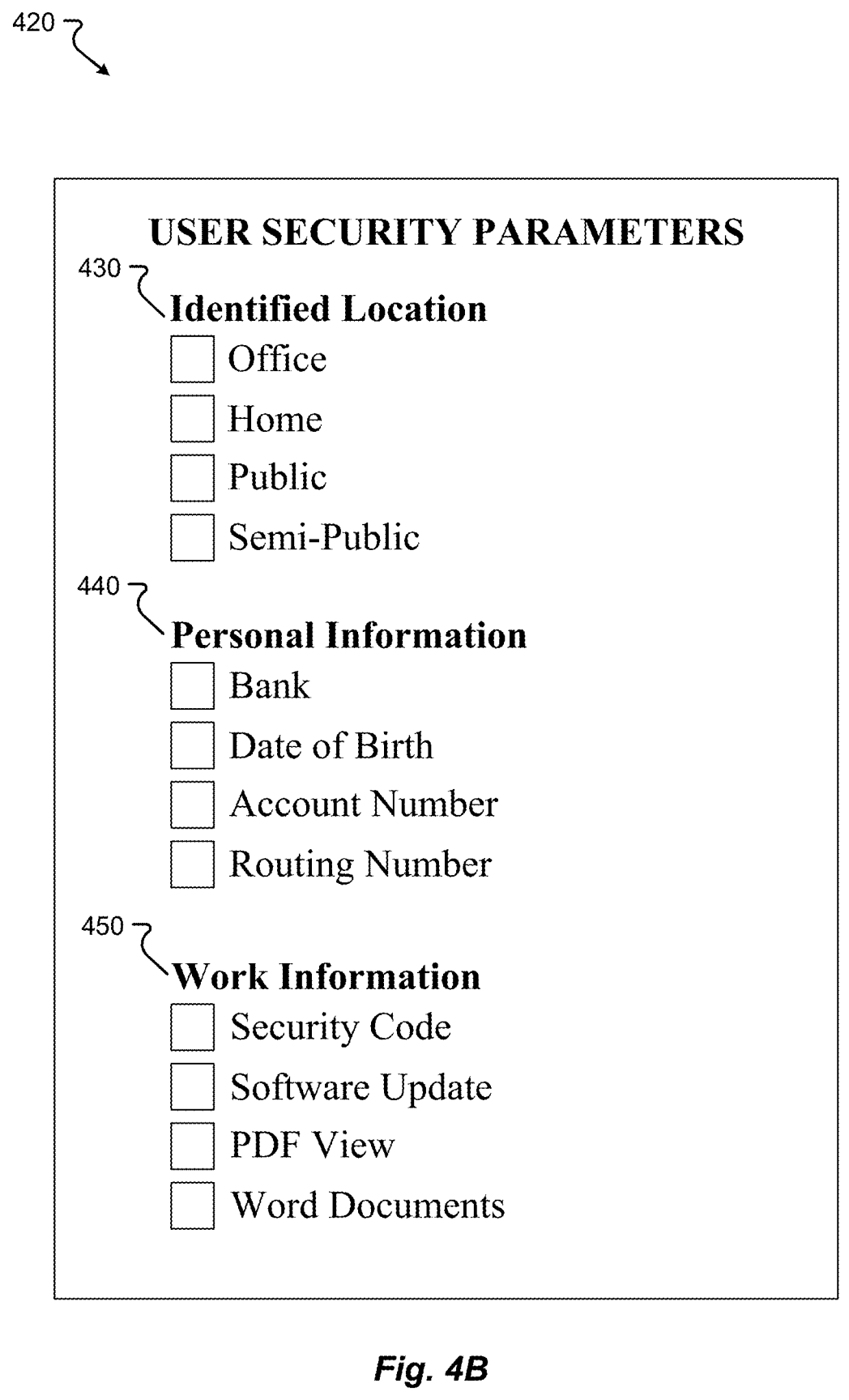

420

USER SECURITY PARAMETERS

430

Identified Location

☐ Office

☐ Home

☐ Public

☐ Semi-Public

440

Personal Information

☐ Bank

☐ Date of Birth

☐ Account Number

☐ Routing Number

450

Work Information

☐ Security Code

☐ Software Update

☐ PDF View

☐ Word Documents

*Fig. 4B*

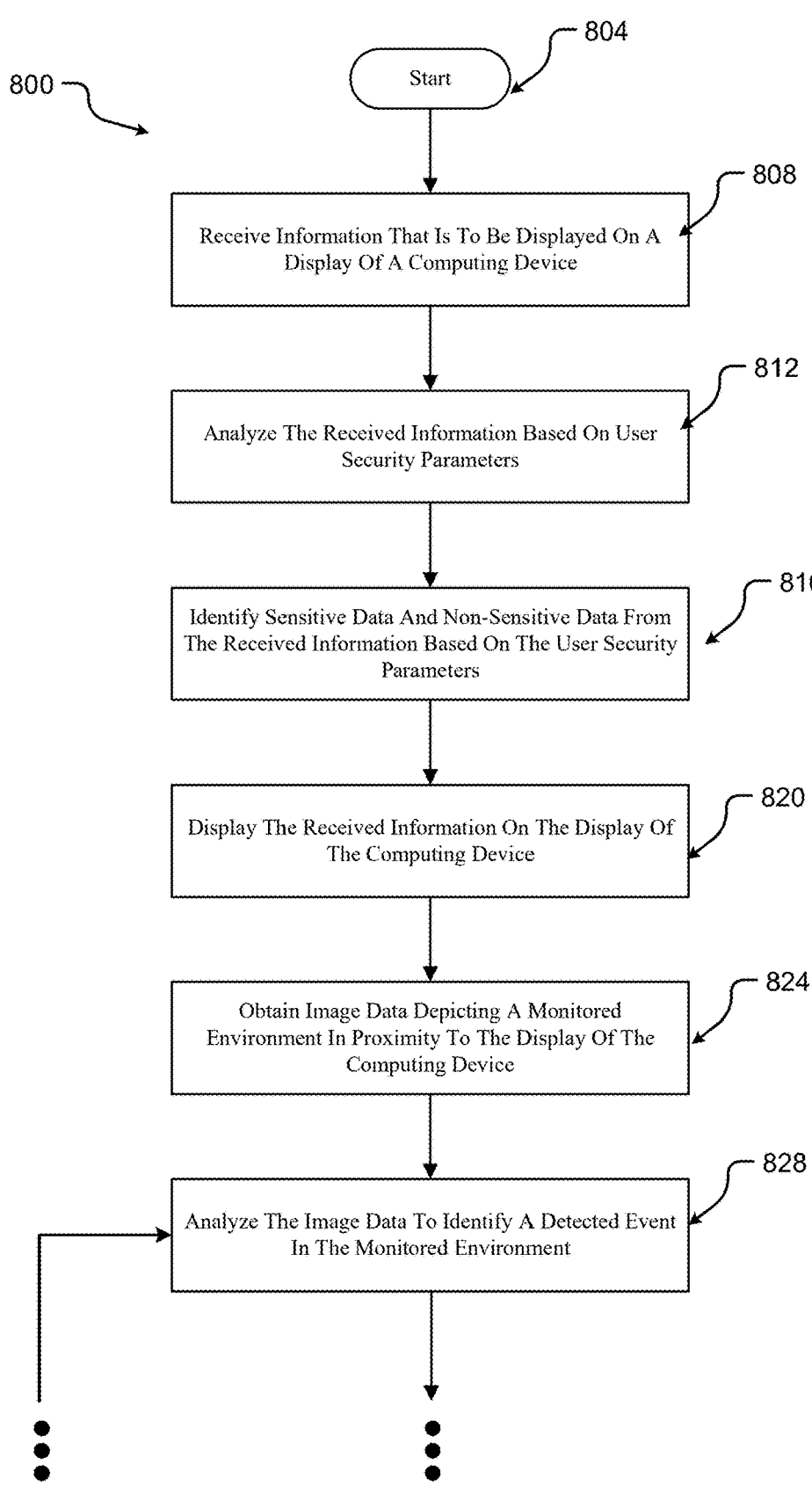

804

Start

800

808

Receive Information That Is To Be Displayed On A Display Of A Computing Device

812

Analyze The Received Information Based On User Security Parameters

816

Identify Sensitive Data And Non-Sensitive Data From The Received Information Based On The User Security Parameters

820

Display The Received Information On The Display Of The Computing Device

824

Obtain Image Data Depicting A Monitored Environment In Proximity To The Display Of The Computing Device

828

Analyze The Image Data To Identify A Detected Event In The Monitored Environment

*Fig. 8A*

MASKING SENSITIVE DATA ON DETECTING PRESENCE OF NON-AUTHORIZED USER

The present disclosure is generally directed to the confidentiality of information displayed on a screen or entered data on electronic devices and, in particular, towards systems and methods of preventing unwanted viewing of sensitive data by unauthorized persons.

BACKGROUND

Devices, such as desk computers, panel computers, smart mobile terminals, bank machines, etc. have a display function to display information. For example, emails and pages of the Internet can be displayed. When the devices are used to edit or display confidential or personal content, a user of the device may want to prevent unwanted viewing from unauthorized persons. Moreover, when someone is accessing confidential/private/sensitive information of the device (e.g., a laptop, a mobile device, a television, etc.), an unauthorized person or unknown person may barge in and may be able to see the information which was not intended for sharing.

As such, these devices cannot adequately maintain privacy for information displayed to the user when the device is in use. Therefore, it is possible for unauthorized persons to see, or even record, such information from nearby locations, such as over the shoulder of the device user, while the authorized user is viewing it, a practice commonly referred to as "shoulder surfing." With the increasing use of portable computers in public locations, display of information in a manner that permits unauthorized viewing, whether in public, semi-public, and even restricted locations, is becoming increasingly problematic.

Currently there are authorization methods to access devices which use passwords, tokens, fingerprints, face-recognition, etc. to protect information from unwanted viewing. Once access is granted, however, there is no further check to detect if the confidential information is being accessed only by the authorized person. Moreover, even when the authorized person is the only one that can access the confidential information, unauthorized persons can see the confidential information from nearby locations or barge in while the authorized person is accessing the confidential information of the device.

Conventional approaches for preventing unwanted viewing of information by unauthorized persons require the user to implement some command or other deliberate action to change the degree of security to the extent any such change in degree is possible. For example, users often want to view data displays and sensitive information not only in relatively secure locations, such as their offices, but also in homes, coffee shops, airports and other unsecured environments where unauthorized individuals or devices can also view their displays, possibly without their knowledge. But users often forget to make adjustments to their security settings to account for the loss of privacy when moving from office to public spaces, thus risking both deliberate and inadvertent security compromise. Therefore, there is room for improvement in the art. For example, there is a need for some way to automatically adjust the level of security in accordance with the computer's and the user's environment.

BRIEF DESCRIPTION OF THE DRAWINGS

FIG. 4B illustrates a list of user security parameters used for automatically censoring sensitive data in accordance with embodiments of the present disclosure;

FIGS. 8A and 8B depict a flow diagram depicting a method for automatically censoring sensitive data in accordance with embodiments of the present disclosure.

DETAILED DESCRIPTION

Figure 1:
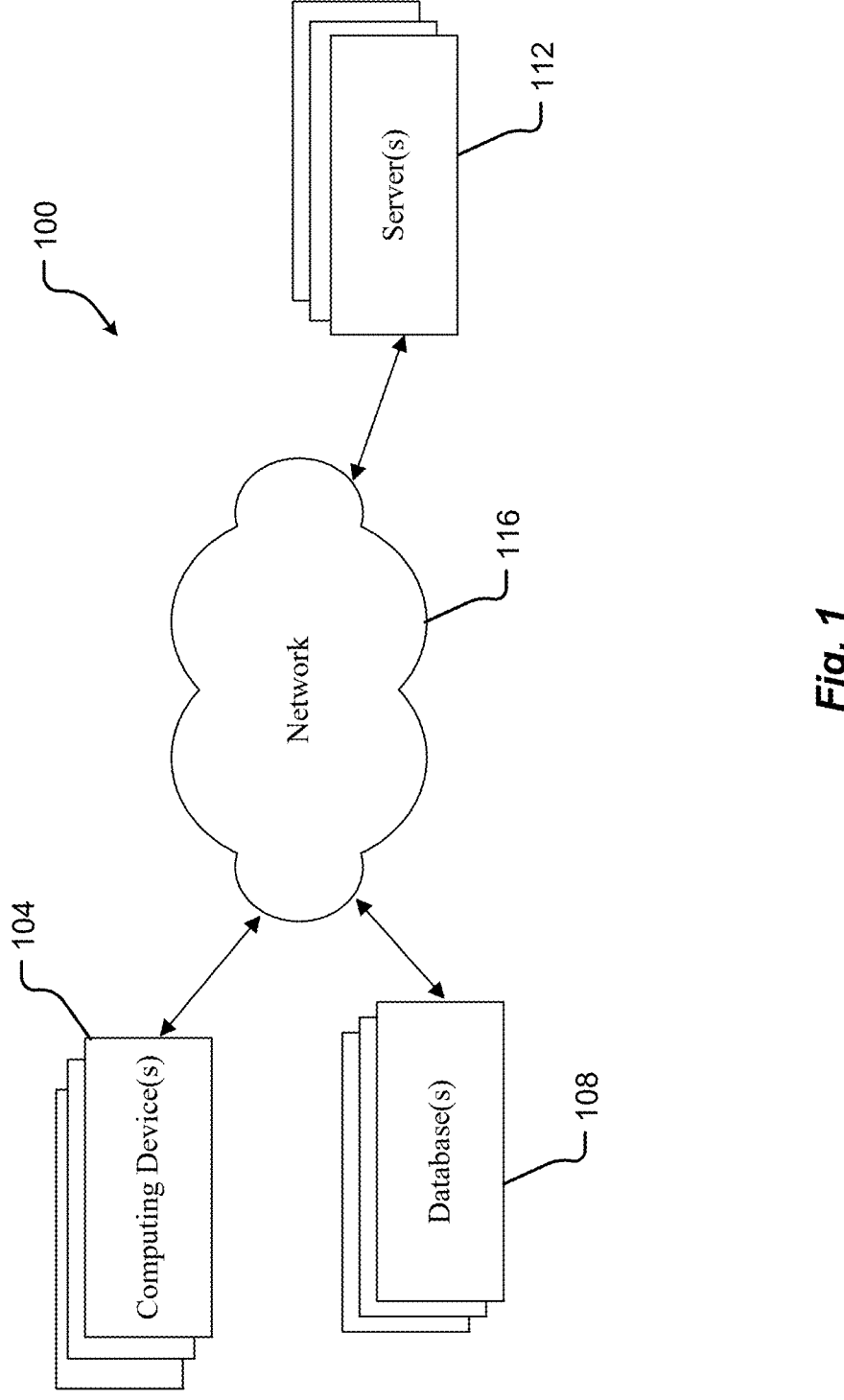
FIG. 1 is a block diagram of a computer network environment in accordance with embodiments of the present disclosure.

FIG. 1 is a block diagram of an illustrative computing environment 100 in accordance with embodiments of the present disclosure. The illustrative computing environment 100 includes one or more computing device(s) 104, one or more database(s) 108, and one or more server(s) 112 connected via a network 116 as illustrated in FIG. 1. By interconnecting the one or more user device(s) 104, one or more database(s) 108, and one or more server(s) 112 via the network 116, automatically censoring sensitive data may be performed.

The one or more computing device(s) 104 may in some embodiments of the present disclosure include desktop and portable computers and computer-controlled devices, such as personal computer (PC)s, laptop computers, notebooks, smartphones, tablet computers, personal digital assistant (PDA)s, video systems, automated teller machine (ATM)s and/or any other device capable of running an operating system ("OS"), at least a web browser, a Session Initiation Protocol (SIP) application, and/or the like and capable of displaying sensitive information. The one or more computing device(s) 104 may run various versions of Microsoft Corp.'s Windows® and/or Apple Corp.'s Macintosh® operating systems) and/or workstation computers running any of a variety of commercially-available UNIX® or UNIX-like operating systems. These one or more computing device(s) 104 may also have any of a variety of applications, including for example, database client and/or server applications, and web browser applications.

Alternatively, the one or more computing device(s) 104 may be capable of communicating via network 116 and/or displaying and navigating web pages or other types of electronic documents or information.

In some embodiments of the present disclosure, the one or more computing device(s) 104 are portable (e.g., mobile) devices. In other embodiments of the present disclosure, the one or more computing device(s) 104 are stationary devices. In further embodiments of the present disclosure, the one or more computing device(s) 104 are a combination of portable devices and stationary devices. The one or more computing device(s) 104 may provide any combination of several different types of inputs and/or output, such as speech only, speech and data, a combination of speech and video, or a combination of speech, data and video. Information communicated between the one or more computing device(s) 104 and/or the one or more server(s) 112 may include control signals, indicators, audio information, video information, and data.

Network 116 can be or may include any collection of communication equipment that can send and receive electronic communications, such as a private network, a standard Plain Old Telephone System ("POTS"), an Integrated Services Digital Network ("ISDN"), the Internet, a Wide Area Network (WAN), a Local Area Network (LAN), a Voice over IP ("VOIP") network, the Public Switched Telephone Network (PSTN), a SIP network, a packet switched network, a circuit switched network, a cellular network, a combination of these, and the like. Network 116 may include wired and/or wireless communication technologies. In accordance with embodiments of the present disclosure, network 116 may include any type of known communication medium or collection of communication media and may use any type of protocols to transport messages between endpoints. Network 116 can use a variety of electronic protocols, such as Ethernet, IP, SIP, Integrated Services Digital Network (ISDN), email protocols, text messaging protocols (e.g., Short Message Service (SMS)), and/or the like. Network 116 is an electronic communication network configured to carry messages via packets and/or circuit switched communications. Network 116 may include a number of different communication media such as coaxial cable, copper cable/wire, fiber-optic cable, antennas for transmitting/receiving wireless messages, and combinations thereof.

As mentioned above, computing environment 100 includes one or more server(s) 112. According to some embodiments of the present disclosure, the one or more server(s) 112 may include a conference server, a webserver, a file server, and an application server, for example. The webserver may be used to process requests for webpages or other electronic documents from the one or more computing device(s) 104. The webserver can run an operating system including any of those discussed above, as well as any commercially-available server operating systems. The webserver can also run a variety of server applications, including SIP servers, HTTP(s) servers, FTP servers, CGI servers, database servers, Java® servers, and the like.

In particular, the one or more server(s) 112 may include network connected computer systems hosting one or more webpages, for example. Information hosted on the one or more server(s) 112 may be displayed in graphical user interface (GUI) elements on one or more computing device(s) 104 via browser windows. The one or more server(s) 112 can be or may include any software/hardware that can work with the one or more computing device(s) 104 to provide one or more webpages, such as Apache®, Nginx®, Microsoft-ITS®, Tomcat®, and/or the like. The webserver may include different webservers from different companies, enterprises, groups, and/or the like. The webserver provides webpage(s) that can be viewed by a user running the one or more computing device(s) 104.

The file and/or application servers, in addition to including an operating system, include one or more applications accessible by a client running on the one or more computing device(s) 104. The one or more server(s) 112 may be one or more general purpose computers capable of executing programs or scripts in response to the one or more computing device(s) 104. As one example, the one or more server(s)

112 may execute one or more web applications. The web application may be implemented as one or more scripts or programs written in any programming language, such as Java®, C, C #®, or C++, and/or any scripting language, such as Perl, Python, or TCL, as well as combinations of any programming/scripting languages. The application server may also include database servers, including without limitation those commercially available from Oracle®, Microsoft®, Sybase®, IBM® and the like, which can process requests from database clients running on the one or more computing device(s) 104.

The webpages created by the webserver may be forwarded to the one or more computing device(s) 104 via a web (file) server. Similarly, the webserver may be able to receive webpage requests, webservices invocations, and/or input data from the one or more computing device(s) 104 and can forward the webpage requests and/or input data to the web (application) server. In further embodiments of the present disclosure, the one or more server(s) 112 may function as a file server.

The one or more database(s) 108 may reside in a variety of locations. By way of example, the one or more database(s) 108 may reside on a storage medium local to (and/or resident in) the one or more computing device(s) 104. Alternatively, the one or more database(s) 108 may be remote from any or all of the one or more computing device(s) 104, and in communication (e.g., via the network 116) with one or more of the one or more computing device(s) 104. For example, in various embodiments of the present disclosure, the one or more database(s) 108 may reside on a storage medium local to (and/or resident in) one or more of the server(s) 112. The one or more database(s) 108 may reside in a storage-area network ("SAN"). Similarly, any necessary files for performing the functions attributed to the one or more computing device(s) 104 may be stored locally on the respective computer and/or remotely, as appropriate. The one or more database(s) 108 may be a relational database, such as Oracle 20i®, that is adapted to store, update, and retrieve data in response to SQL-formatted commands. It should be noted that the one or more database(s) 108 should not be considered as required by certain embodiments of the present disclosure. For example, either of the one or more server(s) 112 and/or the one or more computing device(s) 104 may be capable of storing information such as user security parameters, background information, facial prints of individuals, etc., used to automatically censor sensitive data.

Figure 2:
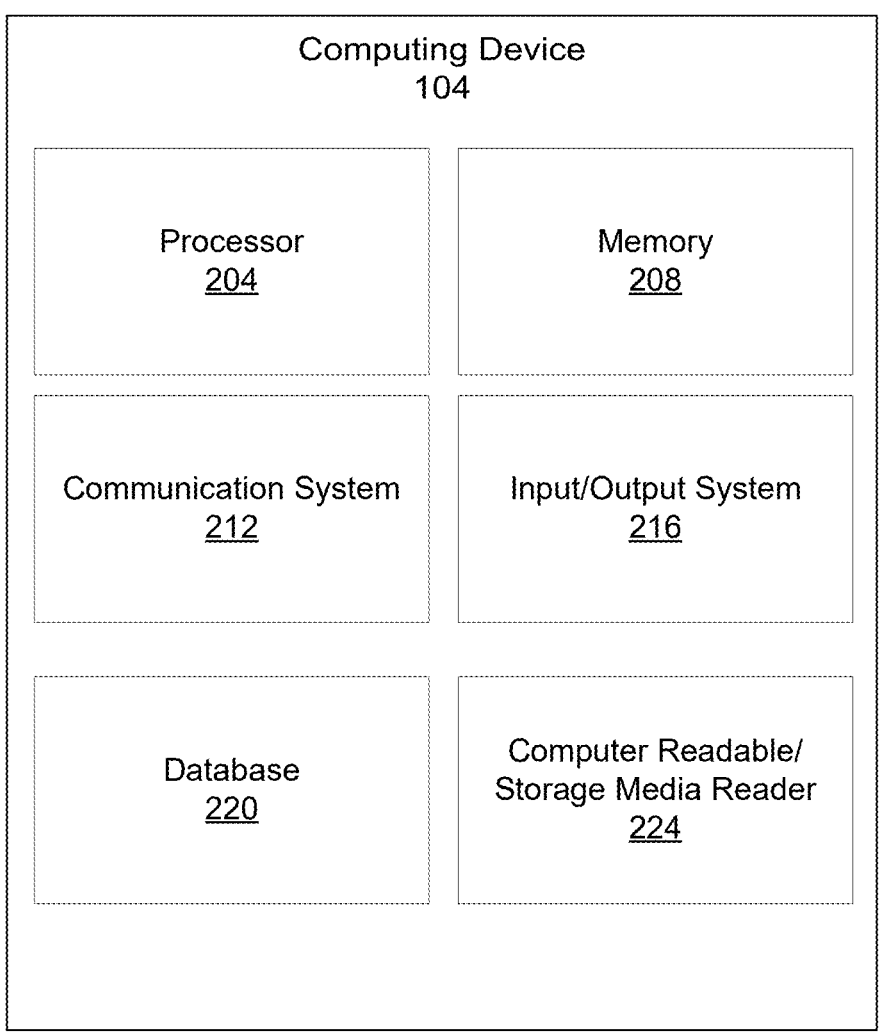
FIG. 2 is a block diagram of a computing device in accordance with embodiments of the present disclosure.

FIG. 2 is a block diagram of a computing device 104 in accordance with embodiments of the present disclosure. Although a computing device 104 is illustrated, the computing device 104, the server 112, the database 108 and/or other computer systems as described herein may be as illustrated in FIG. 2. The computing device 104 may include a processor 204, a memory 208, a communication system 212, an input/output system 216, a database 220 and a computer readable/storage media reader 224.

The processor 204 can be or may include any hardware processor, such as a Digital Signaling Processor (DSP), an application specific processor, a microcontroller, a multi-core processor, and/or the like. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The memory 208 may be any computer readable storage medium, such as a memory (i.e., a computer memory, a hard disk, and/or the like). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), including dynamic RAM (DRAM), synchronous dynamic RAM (SDRAM), and/or static RAM (SRAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In some embodiments of the present disclosure, the memory 208 includes non-volatile computer storage media. For example, the memory 208 may include a hard disk drive, a flash memory, or any other suitable non-volatile computer storage device. In some embodiments, the memory 208 includes both volatile and non-volatile computer storage media.

In some embodiments of the present disclosure, the memory 208 stores data relating to automatically censoring sensitive data. For example, the memory 208 may store user security parameters and the like, that a user uses to censor sensitive data. In some embodiments of the present disclosure, the memory 208 also stores program code and related data, such as an operating system operating on the one or more computing device(s) 104. In some embodiments of the present disclosure, the memory 208 stores program code for automatically censoring sensitive data.

The communication system 212 can be or may include any hardware interface coupled with software that can communicate with the network 116. For example, the communication system 212 can be a wireless interface, a wired interface, a fiber optic interface, an Ethernet interface, a cellular interface, a WiFi interface, and/or the like. The communication system 212 may further include hardware circuits and/or software (e.g., drivers, modem, protocol/network stacks) to support wired or wireless communication between the one or more computing device(s) 104 and other devices or networks. Here, the communication system 212 is used to connect the one or more computing device(s) 104 to a wireless connection. The wireless connection may include a mobile (cellular) telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™. Alternatively, the wireless connection may employ a Zig-Bee® connection based on the IEEE 802 standard. In some embodiments, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The input/output system 216 can be or may include input devices, output devices and/or combinations thereof. More particularly, the input/output system 216 can be or may include any type of hardware interface coupled with software that can communicate with a user of the one or more computing device(s) 104. For example, input devices, in some embodiments of the present disclosure, may include any known computer input device including a touch panel, a button, a keypad, and the like. In certain embodiments of the present disclosure, the input device includes a camera for capturing image data. In some embodiments of the present disclosure, a user may input instructions for monitoring an environment in proximity to a display of the one or more computing device(s) 104. In some embodiments of the present disclosure, an input device (or portions thereof) may be integrated with an output device, for example, as a touchscreen or similar touch-sensitive display. In some embodiments, an input device includes two or more different devices, such as a camera and a touch panel.

An output device in some embodiments of the present disclosure, is configured to output visual, audible, and/or tactile signals. In some embodiments of the present disclosure, an output device may include an electronic display capable of outputting visual data to a user. For example, an output device may include a liquid crystal display (LCD) display, a light emitting diode (LED) display, an organic LED (OLED) display, a projector, or similar display device capable of outputting images, text, or the like to a user. In certain embodiments of the present disclosure, an output device may include one or more speakers for producing sound. In some embodiments of the present disclosure, an output device may include one or more tactile devices for producing vibrations, motion, or other tactile outputs.

The database 220 may include a record for each user of the computing environment 100 as illustrated in FIG. 1. The record may include, for example, a username, password, user security parameters, stored images, reference images, target images, threshold values, and so on as discussed in greater detail in FIG. 3. According to embodiments of the present disclosure, database 220 may include, for example, flash and other nonvolatile solid-state storage or solid-state drive (SSD), such as a flash drive, flash memory, or USB flash drive. Other examples of database 220 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The computer-readable/storage media reader 224 can further be connected to a computer-readable storage medium, together (and, optionally, in combination) with memory 208 comprehensively representing remote, local, fixed, and/or removable storage devices plus storage media for temporarily and/or more permanently containing computer-readable information. The communication system 212 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

Figure 3:
FIG. 3 is a block diagram of an environment in which a system for automatically censoring sensitive data on a computing device is used in accordance with embodiments of the present disclosure.
Figure 3:
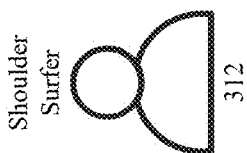

FIG. 3 is a block diagram of an environment 300 in which a system 350 for automatically censoring sensitive data on a computing device 304 is used in accordance with embodiments of the present disclosure. The environment 300 includes a computing device 304 including the system 350, a user 308 of computing device 304 and an unauthorized person 312 (e.g., "a shoulder surfer") that may engage in unauthorize viewing of the computing device 304. As illustrated in FIG. 3, the computing device 304 includes input/output systems such as a camera 316 and a screen or display 334 that displays information 338. The computing device 304 further includes the system 350 including a sensitive data protection module 354. The sensitive data protection module 354 includes an image acquisition and comparison unit 358, a notification unit 382, an event detector 386, a censoring unit 390 and user security parameters 374. In a specific embodiment of the present disclosure, the sensitive data protection module 354 may be implemented in a mobile application program or application. The application program may be available for download on a mobile application marketplace or distribution platform. The sensitive data protection module 354 can execute as a background service or application to help protect the information 338 being displayed on the screen 334 by another application program.

The front surface of the computing device 304 includes the screen 334 and the camera 316 (e.g., a front-facing camera). The information 338 is displayed on the screen 334 so that the user 308 can view the information 338. In many cases, the user 308 may be using the computing device 304 in public. For example, the user 308 may be holding and using the computing device 304 while on a bus, a train, an airplane, or while waiting in line to make a purchase. The user 308 may have set the computing device 304 on a table such as on a table in a coffee shop or restaurant. Public spaces can often be crowded with other people including strangers. Because the computing device 304 may be used in close proximity to strangers, it can be very easy for a stranger (e.g., a shoulder surfer 312) to look at the information 338 being shown on the user's computing device 304.

According to one embodiment of the present disclosure, the images captured by the camera 316 (e.g., images that monitor the environment in proximity to the screen 334) are not displayed on the screen 334 of the computing device 304. According to an alternative embodiment of the present disclosure, the images captured by the camera 316 may be displayed within a small window on the screen 334 along with the information 338.

The image acquisition and comparison unit 358 includes stored images 362, reference images 366, target images 370, a facial recognition unit 392 and an image comparison engine 378. The image acquisition and comparison unit 358 is responsible for obtaining the reference images 366 and the target images 370 from the camera 316 when comparing the reference images 366 to the target images 370 when the user 308 starts operating the computing device 304 at a location. According to one embodiment of the present disclosure, the user 308 prior to beginning work, holds the computing device 304 while the camera 316 captures reference images 366 of the environment in proximity to the screen 334. Because the camera 316 is a front-facing camera, the reference images 366 typically will include a representation of the user 308 in the foreground of the reference images 366 and other objects within a field of view of the camera 316. These other objects will be in the background of the reference images 366. The objects will include things behind or indirectly behind the user 308. The other objects making up the background of the reference images 366 depend on the area or environment in which the user 308 is using the computing device 304. For example, if the user 308 is in a hotel lobby, the background objects may include lounge furniture, tables, wall art, people, luggage, plants, and so forth.

After the user 308 begins work on the computing device 304, the target image 370 is acquired. As discussed above, because the camera 316 is a front-facing camera, the target image 370 typically will include another representation of the user 308 in a foreground of the target image 370, and other objects in a background of the target image 370. The image comparison engine 378 compares the background of the target image 370 with the background of the reference image 366 to detect any changes. For example, the background of the target image 370 may include a person (e.g., stranger or shoulder surfer) who was not present in the reference image 366. The image comparison engine 378 can identify the background change.

Alternatively, the image acquisition and comparison unit 358 may use stored images 362 and the image comparison engine 378 compares the stored image 362 to the target image 370. The stored images 370 include images of people and/or background images. Images of people may include images of work colleagues, supervisors, and/or clients of the user. Moreover, images of people may include images of the user's partner, children, relatives or friends. Background images may include, for example, background settings for the user's office, office conference rooms, home offices, rooms in the user's house, semi-private locations, etc. For example, a stored image of the background of the user's office can be generated and compared with a target image (e.g., after the user 308 begins work on the computing device 304) of the background of the user's office to determine differences in the images. The differences in the images may be associated with a time frame or a distance, for example. According to an embodiment of the present disclosure, the image comparison unit 378 may determine a period of time that the differences between the images exists. Moreover, the image comparison unit 378 may determine a difference in distances of objects between the images.

According to a further embodiment of the present disclosure, the camera 316, may be positioned such that only the background is captured and there is no image of the user 308 in the foreground.

When recognizing individuals in the background, the facial recognition unit 392 compares stored images 362 of individuals or reference images 366 of individuals with the target images 370 of individuals for facial recognition. According to one embodiment of the present disclosure, facial recognition can be performed locally on the computing device 304 or remotely using the one or more server(s) 112 and the one or more database(s) 108 as illustrated in FIG. 1. Because of vast number of resources, performing facial recognition at the one or more server(s) 112 and the one or more database(s) 108 can provide for more accurate results as compared to facial recognition at the computing device 304.

Whether a facial database is stored at the computer device 304, the one or more server(s) 112 and the one or more database(s) 108, or both can depend on factors such as computing resources available on the computing device 304, desired accuracy, application of the system, and others. According to an embodiment of the present disclosure, one or more of the components of the sensitive data protection module 354 reside on the computing device 304. In another embodiment of the present disclosure, one or more components of the sensitive data protection module 354 are distributed between the computing device 304 and the one or more server(s) 112 and the one or more database(s) 108.

The facial recognition unit 392 may incorporate a facial recognition algorithm that identifies facial features by extracting landmarks, or features, from an image of the subject's face. For example, an algorithm may analyze the relative position, size, and/or shape of the eyes, nose, cheekbones, and jaw. These features can then be used to search for other previously stored images with matching features. For example, facial recognition unit 392 may compare stored images 362 and/or reference images 366 of the user's work colleagues, supervisors, clients, partner, children, relatives and/or friends with target images 370 of these individuals.

The facial recognition unit 392 may include a geometric recognition algorithm. This algorithm looks at distinguishing features. Instead or additionally, a photometric recognition algorithm may be used. The algorithm provides a statistical approach that distills an image into values and compares the values with templates to eliminate variances. Other examples of recognition algorithms that may instead or additionally be used include principal component analysis using eigenfaces, linear discriminate analysis, elastic bunch graph matching using the Fisherface algorithm, the Hidden Markov model, and the neuronal motivated dynamic link matching.

Another example of a facial recognition technique that may be used includes three-dimensional face recognition. This technique uses 3D sensors to capture information about the shape of a face. This information is then used to identify distinctive features on the surface of a face, such as the contour of the eye sockets, nose, and chin. One advantage of 3D facial recognition is that it is not affected by changes in lighting like other techniques. It can also identify a face from a range of viewing angles, including a profile view. Three-dimensional data points from a face improve the precision of facial recognition.

Another example of a facial recognition technique that may be used includes skin texture analysis. This technique uses the visual details of the skin to turn the unique lines, patterns, and spots apparent in a person's skin into a mathematical space. The facial recognition unit 392 may include a single recognition technique or a combination of recognition techniques. For example, skin texture analysis may be used in combination with other recognition techniques to provide accurate recognition.

According to an embodiment of the present disclosure, the facial recognition unit 392 may determine a period of time that one or more recognized or unrecognized images of individuals appear in the image of the environment of the computing device 304. Moreover, the facial recognition unit 392 may determine a distance to the user 308 of one or more recognized or unrecognized images of individuals that appear in the image of the environment of the computing device 304.

The user security parameters 374 include preselected information by the user 308 identifying sensitive data from the information 338 that is to be displayed on the screen 334 of the computing device 304. User security parameters 374 may include, for example, identified location parameters (e.g., home, office, private, public, semi-private, semi-public etc.), personal information parameters (e.g., name, telephone number, personal email address, date of birth, social security number, banking details, height, weight, place of birth, home address, work address, marital status, verification information, one time passwords, pin numbers, etc.), work information parameters (e.g., security codes, salary, business email address, project information, software details, updates to software or project information, PDF views, programming applications, chat applications, Word documents, etc.). As an example, the identified location parameter is used to determine what information is to be displayed or censored based on the location determined by the image comparison engine 378. Therefore, if it is determined that the user is located in the user's office and an individual is not recognized in the background by the facial recognition unit 392, then personal information such as work address may not be censored as compared to the work address being censored when it is determined the user is located in a public place and an individual is not recognized in the background by the facial recognition unit 392. Other examples may include not censoring a telephone number, marital status, home address or place of birth, if the image comparison engine 378 determines that the user is at home and a family member is not recognized in the background by the facial recognition unit 392, censoring a PDF view, project information or software details, when it is determined the user is located in a semi-public place (e.g., office cafeteria) and an individual is not recognized in the background by the facial recognition unit 392, etc.

The event detector 386 determines if a particular event has taken place. According to one embodiment of the present disclosure, an event could be a change in background, unrecognition (e.g., via facial recognition) individual in the background, etc. A detected threshold event would be a change in background within a predetermined period of time. For example, if the background change is within a predetermined period of time, the threshold event is detected and if the background change is not within the predetermined period of time, then the threshold event is not detected. As another example, a threshold event is detected if an individual is not recognized within a predetermined period of time or within a predetermined distance to the user and the threshold event is not detected if an individual is not recognized outside of the predetermined period of time or not within the predetermined distance to the user.

The censoring unit 390 censors sensitive data based on a detected event or a detected threshold event and the user security parameters as discussed above. The censoring unit 390 censors the sensitive data by masking a field such as a field label, an input field, or both. According to embodiments of the present disclosure, the system 350 permits or displays values input by a user 308 into an input field, determines an event has taken place such that backgrounds of the stored image 362 or reference image 366 and the target image 370 have changed, an individual is not recognized by the facial recognition unit 392 in the background or determines a detected threshold event has taken place within a predetermined time or a predetermined location or both and after determining that the detected event has taken place or the detected threshold event has taken place and based on the user security parameters, mask the input values (e.g., replacing the displayed input values with asterisks or other marks).

The alteration to the input values may also include reducing the visibility of information displayed on the screen. Moreover, a graphical region may be generated that overlays, (e.g., is superimposed over, or covers) all or at least a portion of the information shown on the screen. For example, the information shown on the screen may include sensitive data (e.g., social security number) and non-sensitive information (e.g., the name of a country). The system 305 can position the graphical region over the sensitive data, but leave the non-sensitive data exposed or not covered. This allows the user to continue viewing the non-sensitive data but protects the sensitive data from the prying eyes of a potential shoulder surfer.

According to another embodiment of the present disclosure, the change in background, the unrecognized individuals, for a prescribed distance or length of time may also trigger an alert from the notification unit 382. The notification unit 382 is responsible for alerting the user 308 for detected events and detected threshold events. The alert can include displaying a message on the screen 334 to inform the user 308 of the background change, and/or unrecognized individuals, for a prescribed distance or length of time, capturing an image of the change and displaying the image of the change on the screen, or both. For example, the image of the change can include a picture of the individual present in the target image, but not present in the reference image or the stored image. Alternatively, the image can include the unrecognized individual, the unrecognized individual after a predetermined period of time or the unrecognized individual after the unrecognized individual is within a predetermined distance of the user 308.

The notification unit provides a list of the various types of alerts that may be generated. In an embodiment of the present disclosure, alerting the user includes altering the graphical user interface that is displayed on the screen. In another embodiment of the present disclosure, the system 305 can reposition information 338 displayed on the screen 334. In this embodiment of the present disclosure, upon determining that the detected event or the threshold detected event the sensitive data may be moved from a first location (or original location) on the screen 338 to a second location (or new location) on the screen 338, different from the first location. The second location can be a location where it will be more difficult than the first location for the shoulder surfer 312 to watch the screen 338 than the first location. The second location can be a location where it is easier than the first location for the user to cover the screen 338.

The first location may be a center of the screen 338, and the second location may be a corner of the screen 338, a bottom of the screen 338, a top of the screen 338, or combinations of these (e.g., a bottom corner of the screen 338 or top corner of the screen). The first location may be a side of the screen 338 (e.g., left-hand side) and the second location may be a different side of the screen 338 (e.g., right-hand side).

In another embodiment of the present disclosure, the system 350 can capture an image of the detected event or the detected threshold event (e.g., shoulder surfer 312 appearing in background). The captured image can then be displayed on the screen 334.

In another embodiment of the present disclosure, the system 350 may display a notification message on the screen 334. The notification message may include text to indicate to the shoulder surfer 312 that the user 308 is aware of the spying. It should be appreciated that the system 250 can implement a combination of operations or actions to help keep the user's information private (e.g., capture image of shoulder surfer and display notification).

In another embodiment of the present disclosure, the system 305 may provide a silent or coded alert. Such an alert can inform the user 308 that there is a potential shoulder surfer 312 watching the screen, but not alert the shoulder surfer 312 that the user 308 is aware of their presence. For example, the system 305 may cause the computing device 304 to vibrate, generate an audio alert, display an alert code, or combinations of the above-identified alerts. For example, the combination of masking a field and generating an audio alert provides better protection.

The type of alert provided by the system can be user-configurable. For example, one user may select an alert type that captures an image of the background change (e.g., shoulder surfer 312 appearing in background) and displays the image on the screen 334 for both the user 308 and shoulder surfer 312 to see. Alternatively, another user 308 may select an alert type that provides a silent alert. It should be appreciated that an alert may be a visual alert (e.g., display message, flicker screen, darken screen, blank out screen, or apply graphical overlay), audio alert (e.g., beeping, or siren), or both.

As discussed above, the alerts are provided along with the censoring the sensitive information and based on the user security parameters.

Figure 4A:
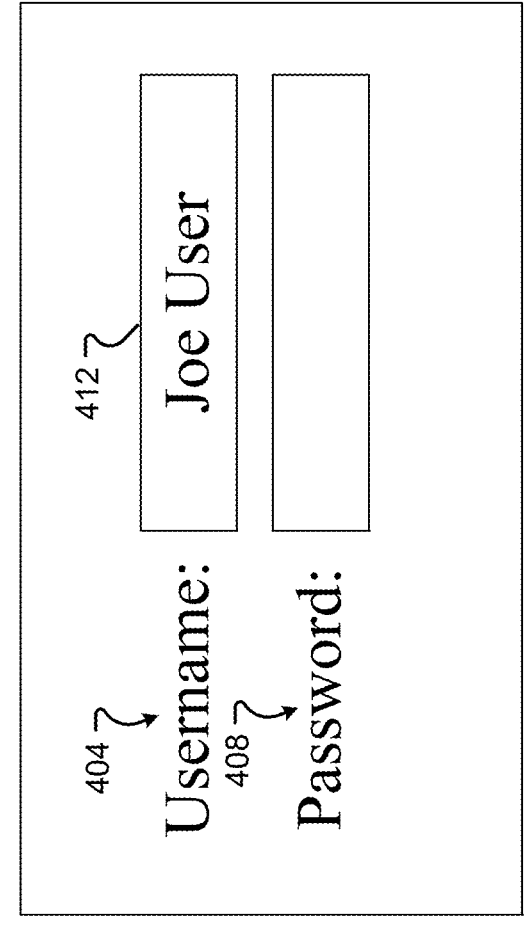
FIG. 4A illustrates the provision of a user identification and authorization dialog in accordance with embodiments of the present disclosure.

FIG. 4A illustrates the provision of a user identification and authorization dialog in accordance with embodiments of the present disclosure. As illustrated in FIG. 4A, a username 404 and a password 408 are required to access the system 350. After "Joe User" 412 is provided as the username 404, the user 308 is required to provide the corresponding password 408 for authentication to the system 350. Proper authentication will allow the user to access the user security parameters for example.

FIG. 4B illustrates a list of user security parameters 420 used for automatically censoring sensitive data in accordance with embodiments of the present disclosure. As discussed above, the user security parameters 420 include preselected information by the user 308 identifying sensitive data from the information 338 that is to be displayed on the screen 334 of the computing device 304. User security parameters 420 may include, for example, identified location parameters 430 (e.g., home, office, private, public, semi-private, semi-public etc.), personal information parameters 440 (e.g., name, telephone number, personal email address, date of birth, social security number, banking details, height, weight, place of birth, home address, work address, marital status, verification information, one time passwords, pin numbers, etc.) and work information parameters 450 (e.g., security codes, salary, business email address, project information, software details, updates to software or project information, PDF views, programming applications, chat applications, Word documents, etc.).

FIGS. 5A-5H are diagrams of example embodiments of graphical user interface (GUI) s used for preventing unwanted viewing of sensitive data by unauthorized persons in accordance with embodiments of the present disclosure.

GUI elements described herein can be or may include any type of user interface element that can be displayed/sounded by a browser such as a button, a window, a pane, panel, a menu, a menu item, an icon, a tab, a text object, a text entry object, a scroll bar, a slider, a cursor, a picture, a video, a sound object, a vibration object, and/or the like.

When a user accesses a webpage using the browser, webpage code may be uploaded from a webserver or other network location. For example, when the user enters a Uniform Resource Locator (URL) in the browser, code from the webpage associated with the URL may be uploaded to the browser.

Figure 5A:
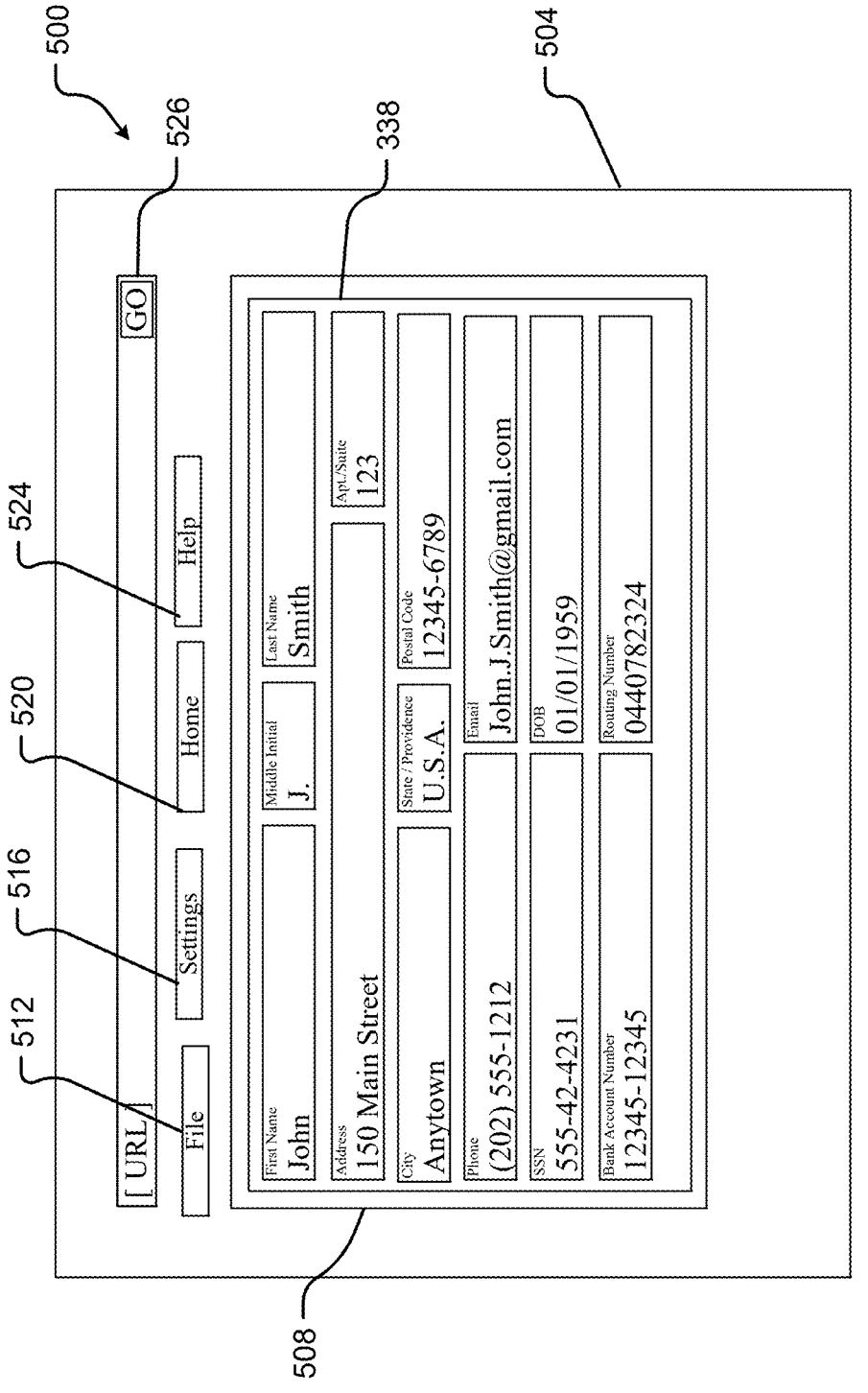
FIGS. 5A-5H are diagrams of example embodiments of graphical user interface (GUI) s used for preventing unwanted viewing of sensitive data by unauthorized persons in accordance with embodiments of the present disclosure.

As illustrated in FIG. 5A, a webpage may include a GUI 500 displayed on one or more computing device(s) 104. The GUI 500 may include an outer window 504 containing a number of GUI elements. The outer window 504 may include a browser window 508 displaying information 338. The GUI 500 may include a series of GUI buttons such as a file button 512, a settings button 516, a home button 520, and/or a help button 524. The GUI 500 may also include a navigation bar 526 enabling users to select a URL to visit in the browser window 508.

The browser window 508 may be configured to display the contents of a webpage accessed from a network location. The navigation bar 526 may be used to enable users to select a URL to visit in the browser window 508. Entering a URL and submitting or clicking an enter or go button may begin a downloading of contents from the URL into the browser window 508.

The outer window 504 may include a series of user interface buttons 512, 516, 520, 524 enabling users to interact with the webpage. For example, the file button 512 may present a dropdown menu providing a number of options such as exit, new window, etc. The settings button 516 may present a pop-up or modal window listing a series of options for user-customizable settings. The home button 520 may direct the user to the homepage of the webpage. The help button 524 provides assistance or help to the user. The information 338 may be personal information which includes, for example, input fields and data, as follows: First Name "John", Middle Initial "J.", Last Name "Smith", Address "150 Main Street", Apt/Suite "123", City "Anytown", State/Providence "U.S.A.", Postal Code "12345-6789", Phone "(202) 555-1212", email "John.J.Smith@gmail.com", Social Security Number (SSN) "555-42-4231", Date of Birth (DOB) "Jan. 1, 1959", Bank Account Number "12345-12345" and "Routing Number "0440782324".

Figure 5B:
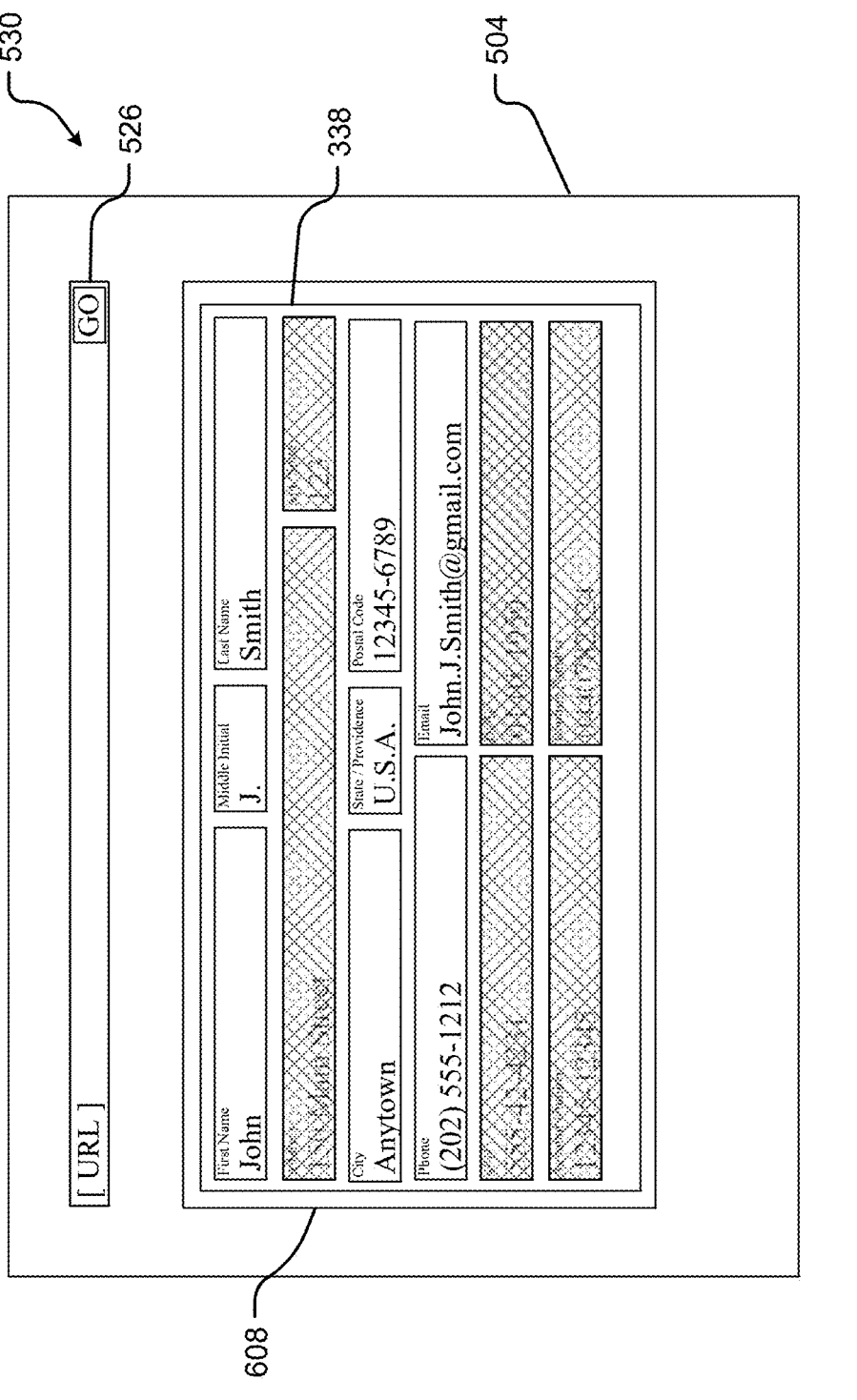

As illustrated in FIG. 5B, a GUI 530 may display personal information 338 with various input fields and data censored or masked. As illustrated, the Address "150 Main Street", Apt/Suite "123", Social Security Number (SSN) "555-42-4231", Date of Birth (DOB) "Jan. 1, 1959", Bank Account Number "12345-12345" and "Routing Number "0440782324" input fields and data are censored by blocking out this information. The other input fields and data remain uncensored since this information has been predetermined by the user as not being sensitive based on the user security parameters.

According to embodiments of the present disclosure, the information may be censored based on user security parameters and detected events or detected threshold events. For example, if the user is in a public location and the user security parameter indicates a public location, when a detected event occurs (e.g., an unrecognized individual is in the background image of an environment in proximity to the display of the computing device) or when a detected threshold event occurs (e.g., an unrecognized individual is in the background image of an environment in proximity to the display of the computing device for a predetermined period of time or at a predetermined distance to the user), these input fields and data a censored based on the user security parameters preselected by the user.

Figure 5C:
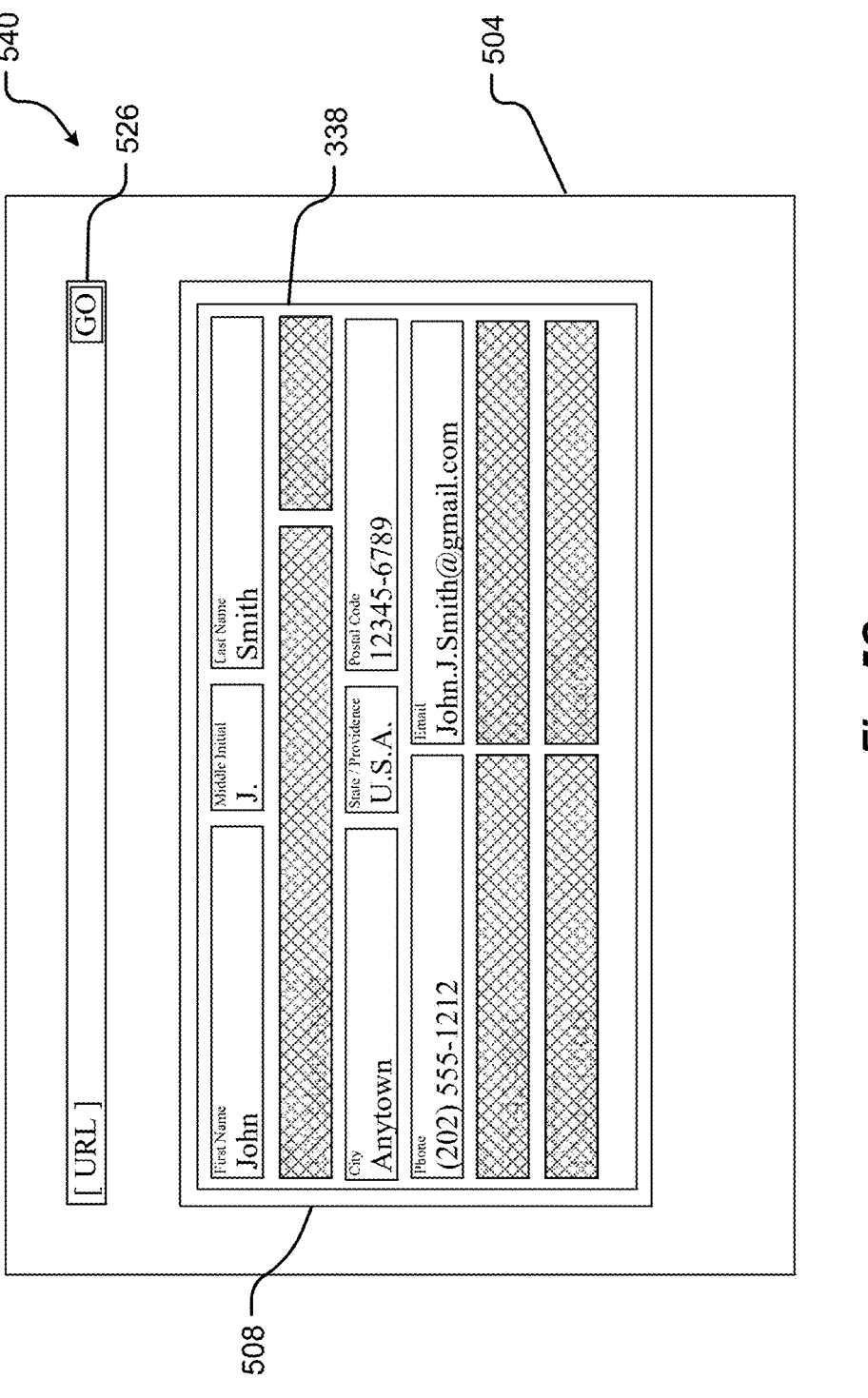

As illustrated in FIG. 5C, a GUI 540 may display the personal information 338 with various input fields and data censored or masked. As illustrated, the Address "150 Main Street", Apt/Suite "123", Social Security Number (SSN) "555-42-4231", Date of Birth (DOB) "Jan. 1, 1959", Bank Account Number "12345-12345" and "Routing Number "0440782324" input fields and data are further censored by being further reduced in visibility. According to embodiments of the present disclosure, the further censoring may be based on a threshold detected event. For example, if a first threshold for a threshold event is reached (e.g., an unrecognized individual is in the background image of an environment in proximity to the display of the computing device for a first predetermined period of time or at a first predetermined distance to the user) the censoring is at a first reduced visibility and if a second threshold for a threshold event is reached (e.g., an unrecognized individual is in the background image of an environment in proximity to the display of the computing device for a second predetermined period of time which is greater than the first predetermined period of time or at a second predetermined distance to the user which is less than the first predetermined distance) the censoring is at a second reduced visibility greater than the first reduced visibility.

Figure 5D:
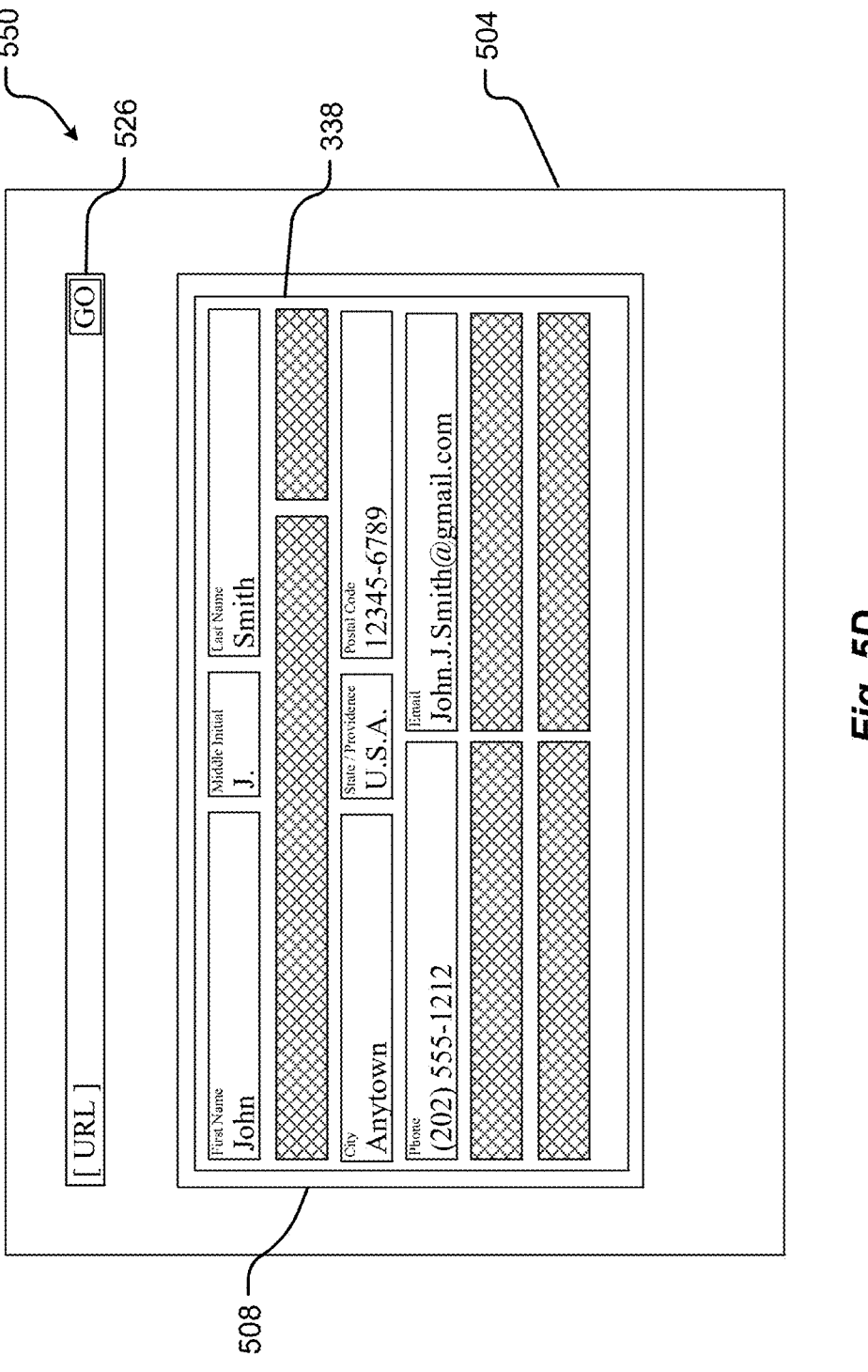

As illustrated in FIG. 5D, a GUI 550 may display the personal information 338 with various input fields and data censored or blocked out. As illustrated, the Address "150 Main Street", Apt/Suite "123", Social Security Number (SSN) "555-42-4231", Date of Birth (DOB) "Jan. 1, 1959", Bank Account Number "12345-12345" and "Routing Number "0440782324" input fields and data are further censored by completely blocking out this information. According to embodiments of the present disclosure, further blocking may be based on a final threshold event being detected. For example, if the final threshold event is detected (e.g., an unrecognized individual is in the background image of an environment in proximity to the display of the computing device at the greatest predetermined period of time or at the least predetermined distance to the user), these input fields and data a censored based on the user security parameters preselected by the user.

Figure 5E:
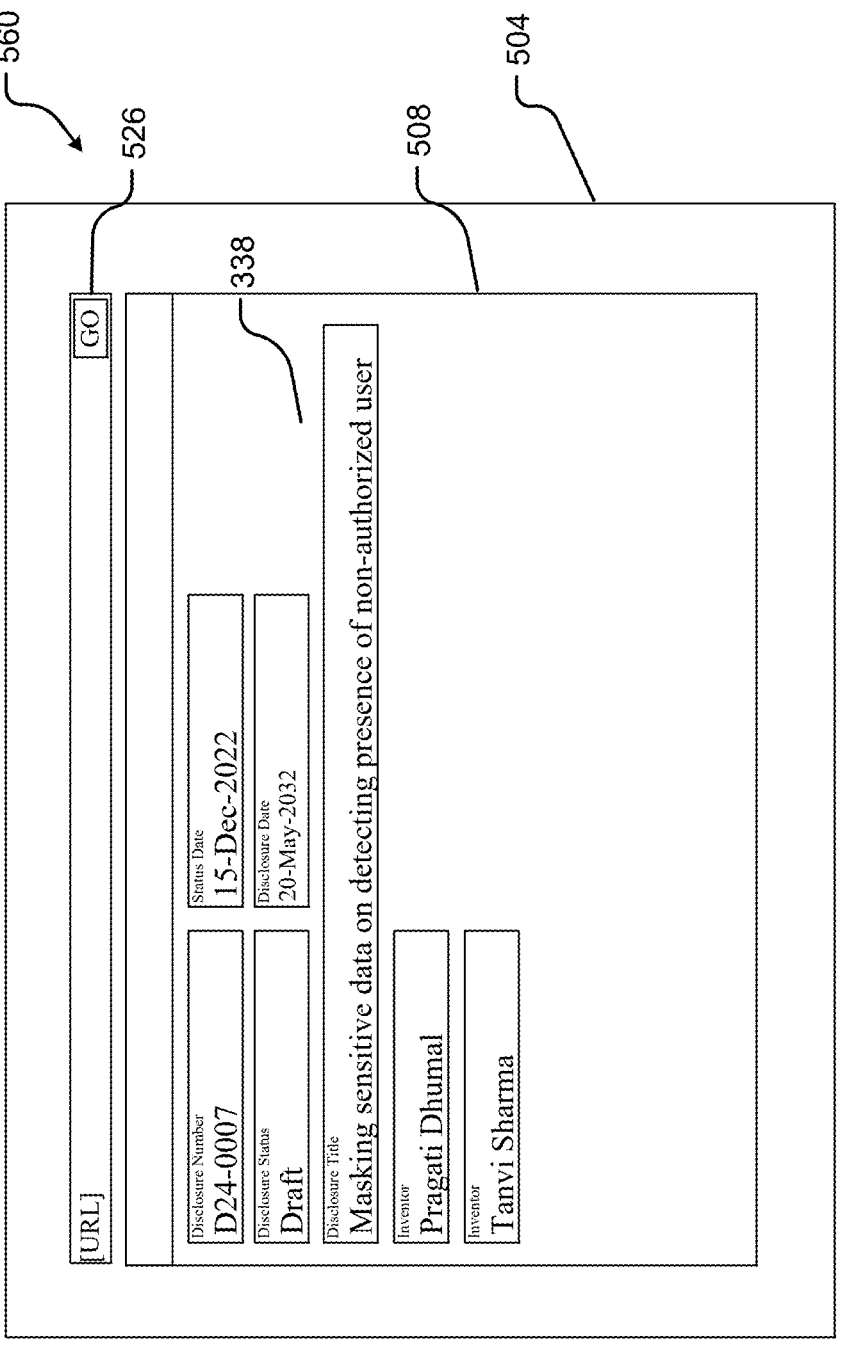

As illustrated in FIG. 5E, a GUI 560 may display work information 338 with various input fields and data as follows: Disclosure Number "D24-0007", status date "15 Dec. 2022", Disclosure Status "Draft", Disclosure Date "20 May 2023", Disclosure Title "Making Sensitive Data on Detecting Presence of Non-Authorized User", Inventor "Pragati Dhumal" and "Inventor "Tanvi Sharma".

Figure 5F:
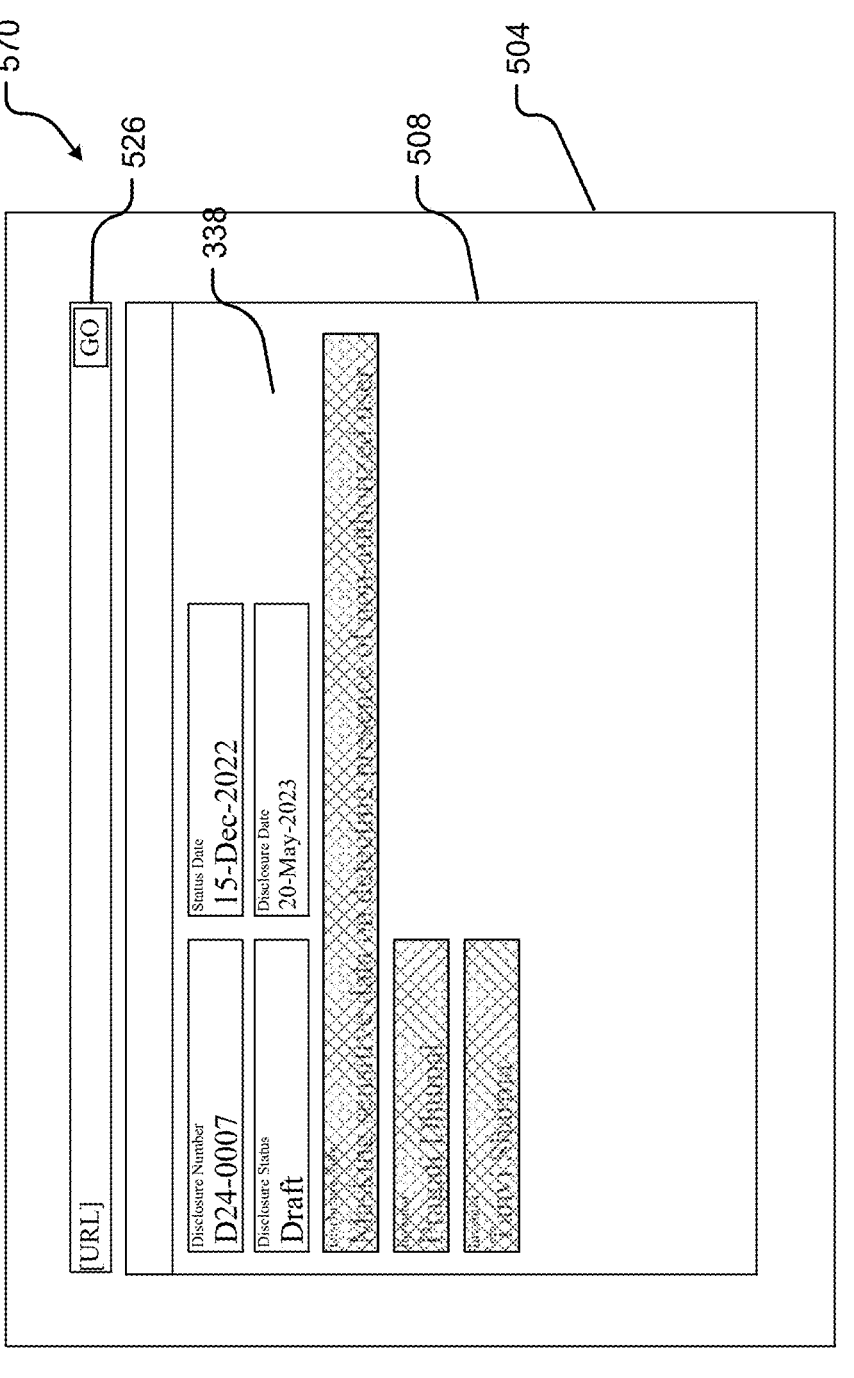

As illustrated in FIG. 5F, a GUI 570 may display work information 338 with various input fields and data censored or masked. As illustrated, the Disclosure Title "Making Sensitive Data on Detecting Presence of Non-Authorized User", Inventor "Pragati Dhumal" and "Inventor "Tanvi Sharma" input fields and data are censored by masking this information. The other input fields and data remain uncensored since this information has been predetermined by the user as not being sensitive based on the user security parameters.

According to embodiments of the present disclosure, the information may be censored based on user security parameters and detected events or detected threshold events. For example, if the user is in a semi-private location such as an office cafeteria and the user security parameter indicates a semi-private location such as an office cafeteria, when a detected event occurs (e.g., an unrecognized individual is in the background image of an environment in proximity to the display of the computing device) or when a detected threshold event occurs (e.g., an unrecognized individual is in the background image of an environment in proximity to the display of the computing device for a predetermined period of time or at a predetermined distance to the user), these input fields and data a censored based on the user security parameters preselected by the user.

Figure 5G:
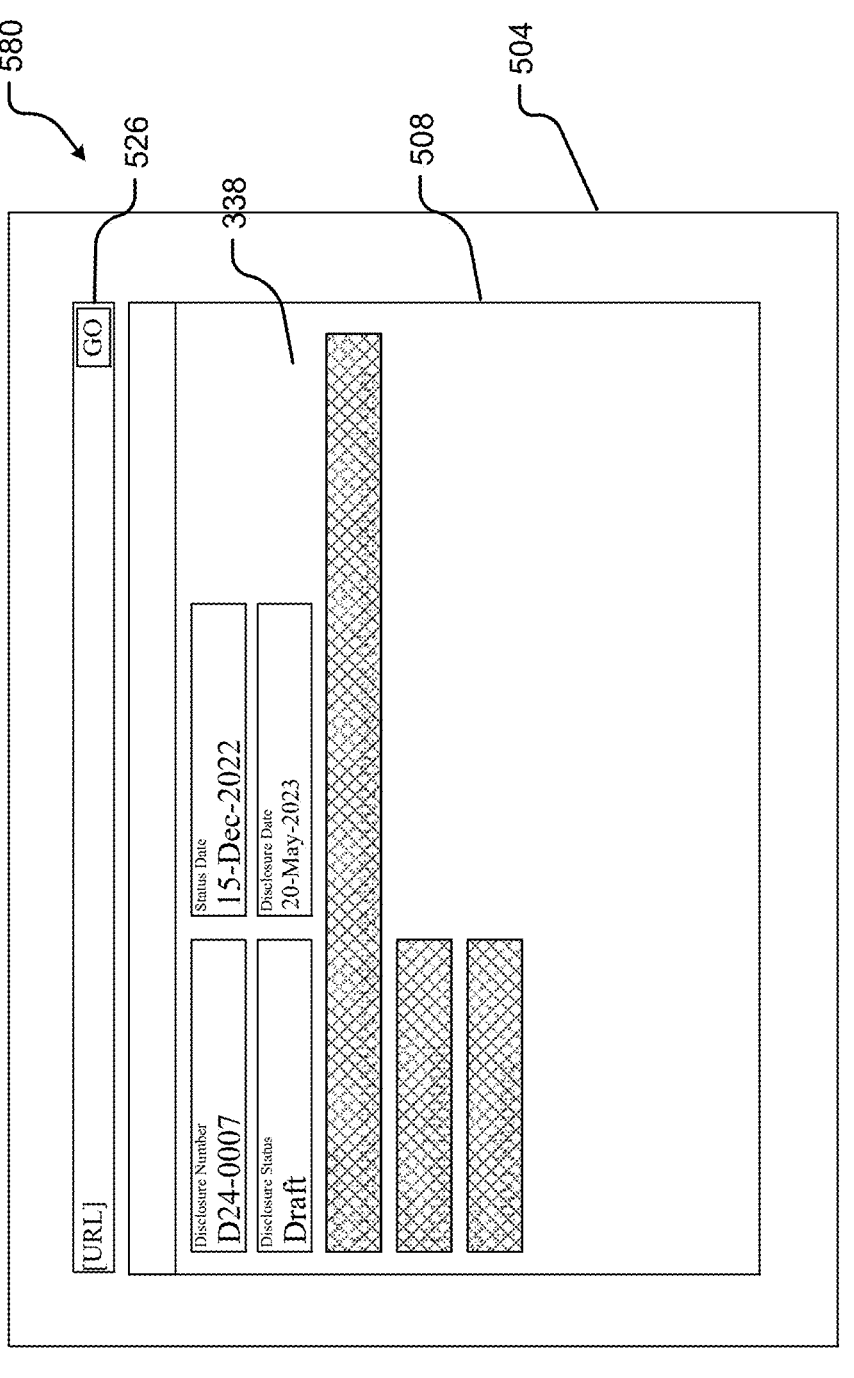

As illustrated in FIG. 5G, a GUI 580 may display work information 338 with various input fields and data censored or masked. As illustrated, the Disclosure Title "Making Sensitive Data on Detecting Presence of Non-Authorized User", Inventor "Pragati Dhumal" and "Inventor "Tanvi Sharma" input fields and data are further censored by being further reduced in visibility. According to embodiments of the present disclosure, the further censoring may be based on a threshold detected event. For example, if a first threshold for a threshold event is reached (e.g., an unrecognized individual is in the background image of an environment in proximity to the display of the computing device for a first predetermined period of time or at a first predetermined distance to the user) the blocking is at a first resolution and if a second threshold for threshold event is reached (e.g., an unrecognized individual is in the background image of an environment in proximity to the display of the computing device for a second predetermined period of time which is greater than the first predetermined period of time or at a second predetermined distance to the user which is less than the first predetermined distance) the blocking is at a second resolution greater than the first resolution.

Figure 5H:
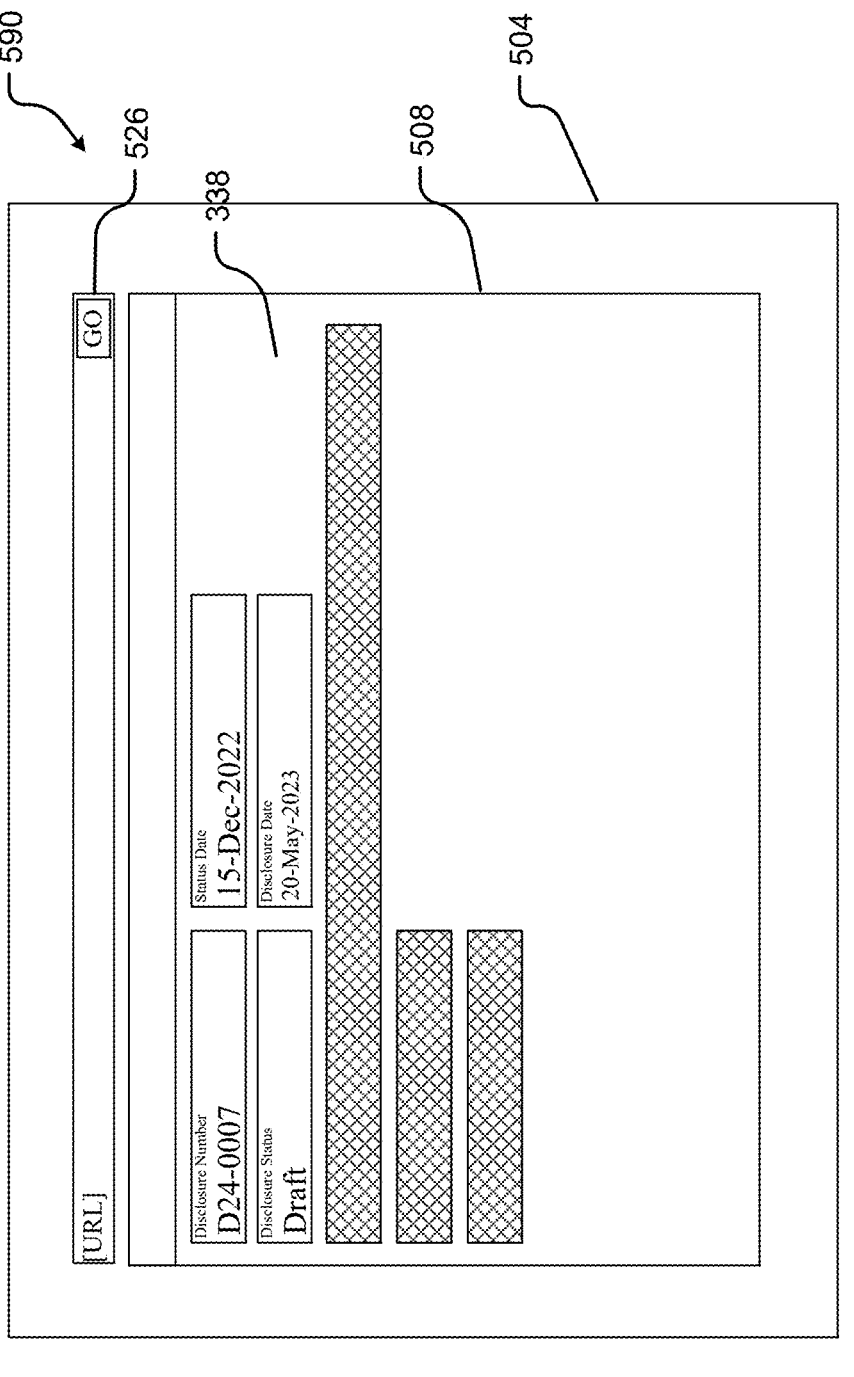

As illustrated in FIG. 5H, a GUI 590 may display work information 338 with various input fields and data censored or blocked out. As illustrated, the Disclosure Title "Making Sensitive Data on Detecting Presence of Non-Authorized User", Inventor "Pragati Dhumal" and "Inventor "Tanvi Sharma" input fields and data are further censored by blocking out this information by completely blocking out this information. According to embodiments of the present disclosure, further blocking may be based on a final threshold event being detected. For example, if the final threshold event is detected (e.g., an unrecognized individual is in the background image of an environment in proximity to the display of the computing device at the greatest predetermined period of time or at the least predetermined distance to the user), these input fields and data a censored based on the user security parameters preselected by the user.

Figure 6A:
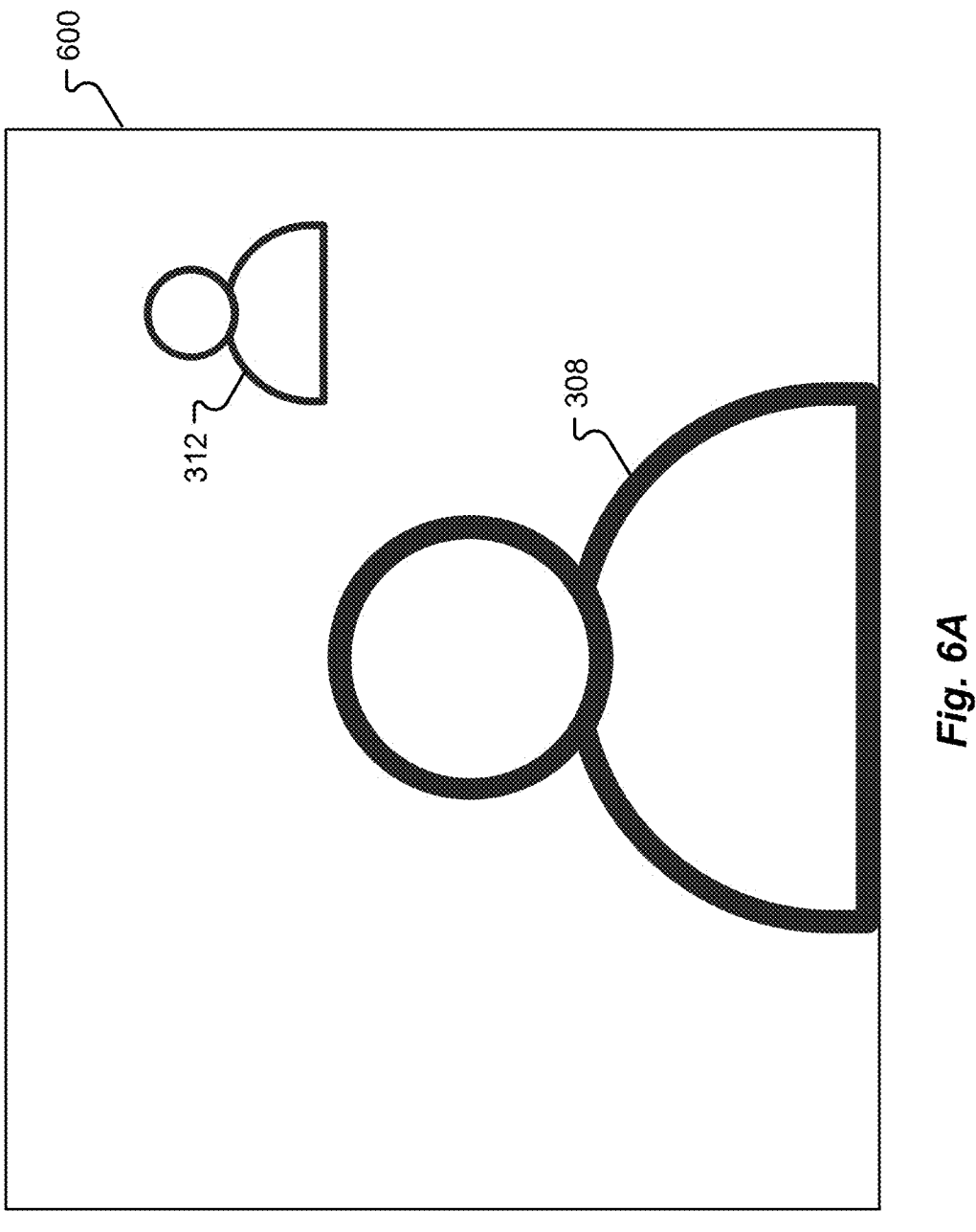
FIG. 6A-6C depict the identification of an unauthorized person in automatically censoring sensitive data in accordance with embodiments of the present disclosure.
Figure 6B:
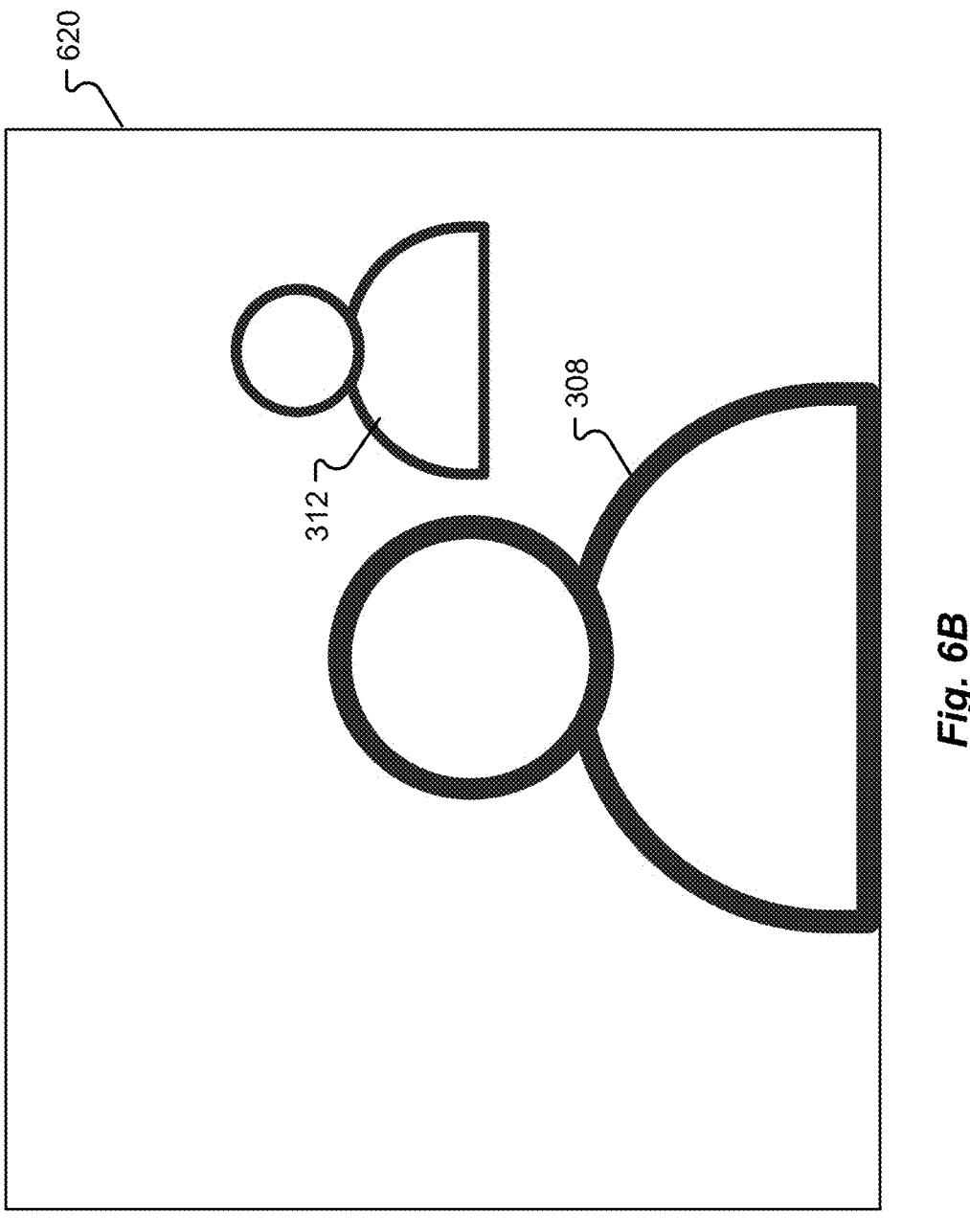
Figure 6C:
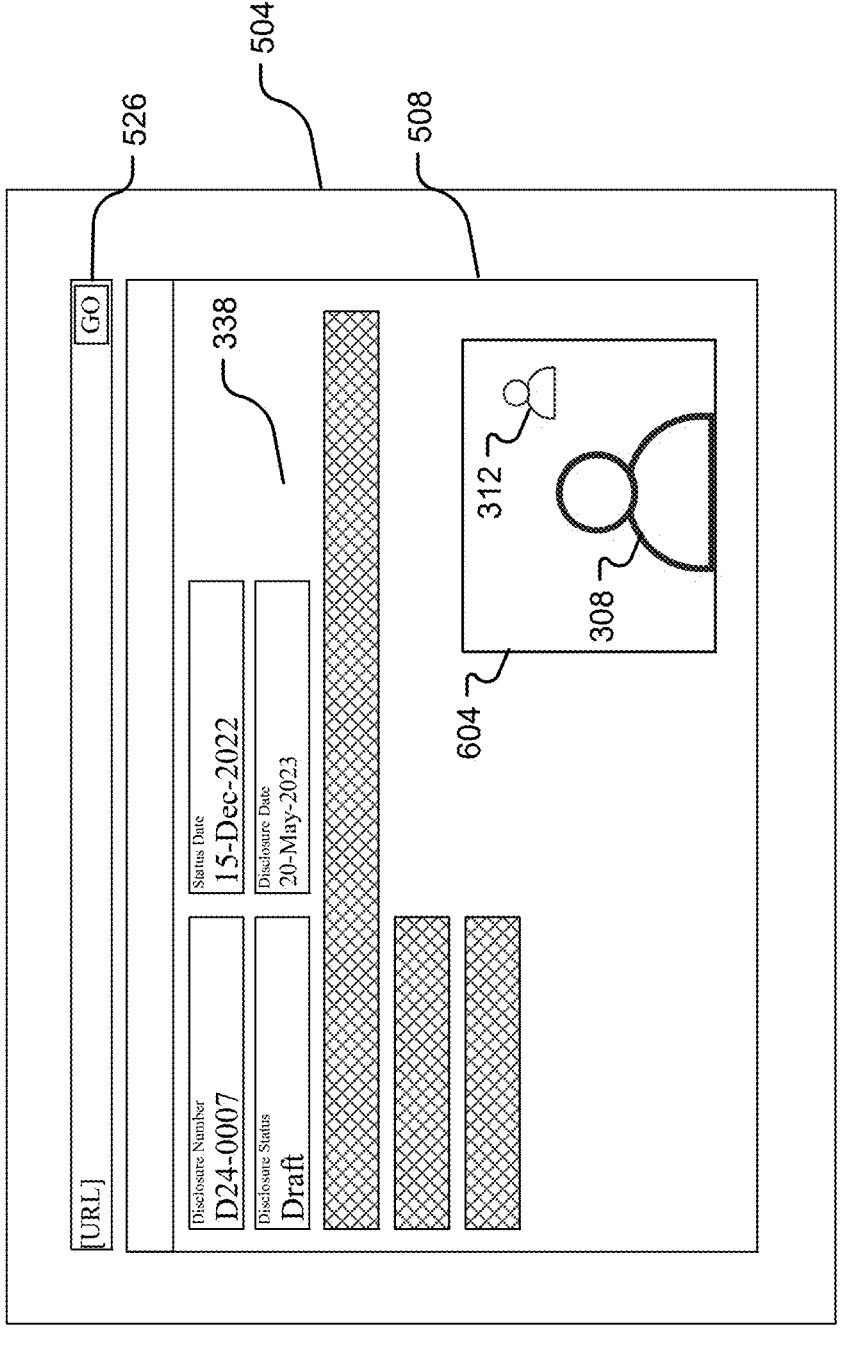

FIG. 6A-6C depict the identification of an unauthorized person in automatically censoring sensitive data in accordance with embodiments of the present disclosure. As illustrated in FIG. 6A an image 600 depicts a user 308 and an unauthorized person 312 in the environment in proximity to the display of the computing device. As illustrated in FIG. 6B an image 620 depicts the user 308 and the unauthorized person 312 in the environment in proximity to the display of the computing device at a closer distance to the user. As illustrated in FIG. 6C, a GUI 630 may display work information 338 with various input fields and data censored or masked. As illustrated, the Disclosure Title "Making Sensitive Data on Detecting Presence of Non-Authorized User", Inventor "Pragati Dhumal" and "Inventor "Tanvi Sharma" input fields and data are further censored by completely blocking out this information. The image 620 which depicts the user 308 and the unauthorized person 312 in the environment in proximity to the display of the computing device at a closer distance to the user is also provided to the user. The image 620 serves as a notification or an alert to the user.

Figure 7:
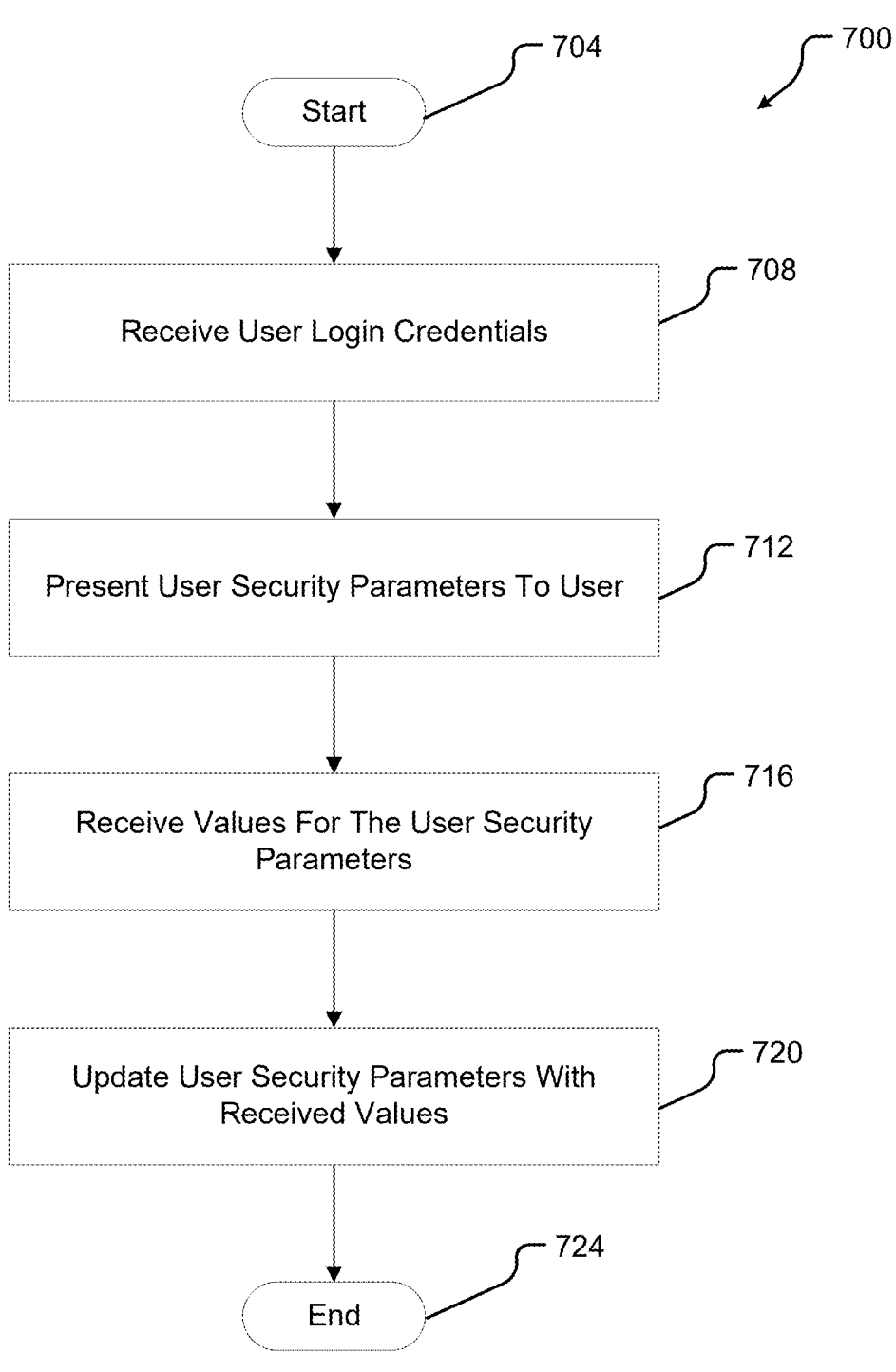
FIG. 7 depicts a flow diagram depicting a method for updating user security parameters in accordance with embodiments of the present disclosure.

FIG. 7 represents a flow diagram depicting method 700 for updating user security parameters in accordance with embodiments of the present disclosure. While a general order of the steps of method 700 is shown in FIG. 7, method 700 can include more or fewer steps or can arrange the order of the step differently than those shown in FIG. 7. Further, two or more steps may be combined in one step. Generally, method 700 starts at a START operation at step 704 and ends with an END operation at step 724. Method 700 can be executed as a set of computer-executable instructions executed by a computer system (e.g., the one or more computing device(s) 104, the one or more server(s) 112, the processor 204, etc.) and encoded or stored on a computer readable medium (e.g., memory 208, etc.). Hereinafter, method 700 shall be explained with reference to the systems, components, modules, applications, software, data structures, user interfaces, etc. described in conjunction with FIGS. 1-6.

As illustrated in FIG. 7, method 700 begins at the START operation at step 704 and proceeds to step 708, where the processor 204 of the one or more computing device(s) 104 or the one or more server(s) 112 receives user login credentials. According to embodiments of the present disclosure, the received login credentials may include, for example, a username and a user password as illustrated in FIG. 4A After the processor 204 of the one or more computing device(s) 104 or the one or more server(s) 112 receives the user login credentials at step 708, method 700 proceeds to step 712, where the processor 204 of the one or more computing device(s) 104 or the one or more server(s) 112 presents user security parameters to the user. According to embodiments of the present disclosure, the user security parameters may include, for example identified location parameters (e.g., home, office, private, public, semi-private, semi-public etc.), personal information parameters (e.g., name, telephone number, personal email address, date of birth, social security number, banking details, height, weight, place of birth, home address, work address, marital status, verification information, one time passwords, pin numbers, etc.), work information parameters (e.g., security codes, salary, business email address, project information, software details, updates to software or project information, PDF views, programming applications, chat applications, Word documents, etc.).

After the processor 204 of the one or more computing device(s) 104 or the one or more server(s) 112 presents user security parameters to the user at step 712, method 700 proceeds to step 716, where the processor 204 of the one or more computing device(s) 104 or the one or more server(s) 112 receives values for the user security parameters.

After the processor 204 of the one or more computing device(s) 104 or the one or more server(s) 112 receives values for the user security parameters at step 716, method 700 proceeds to step 720, where the processor 204 of the one or more computing device(s) 104 or the one or more server(s) 112 updates the user security parameters with the received values.

After the processor 204 of the one or more computing device(s) 104 or the one or more server(s) 112 updates the user parameters with the received values at step 720, method 700 ends with the END operation at step 724.

Figure 8B:
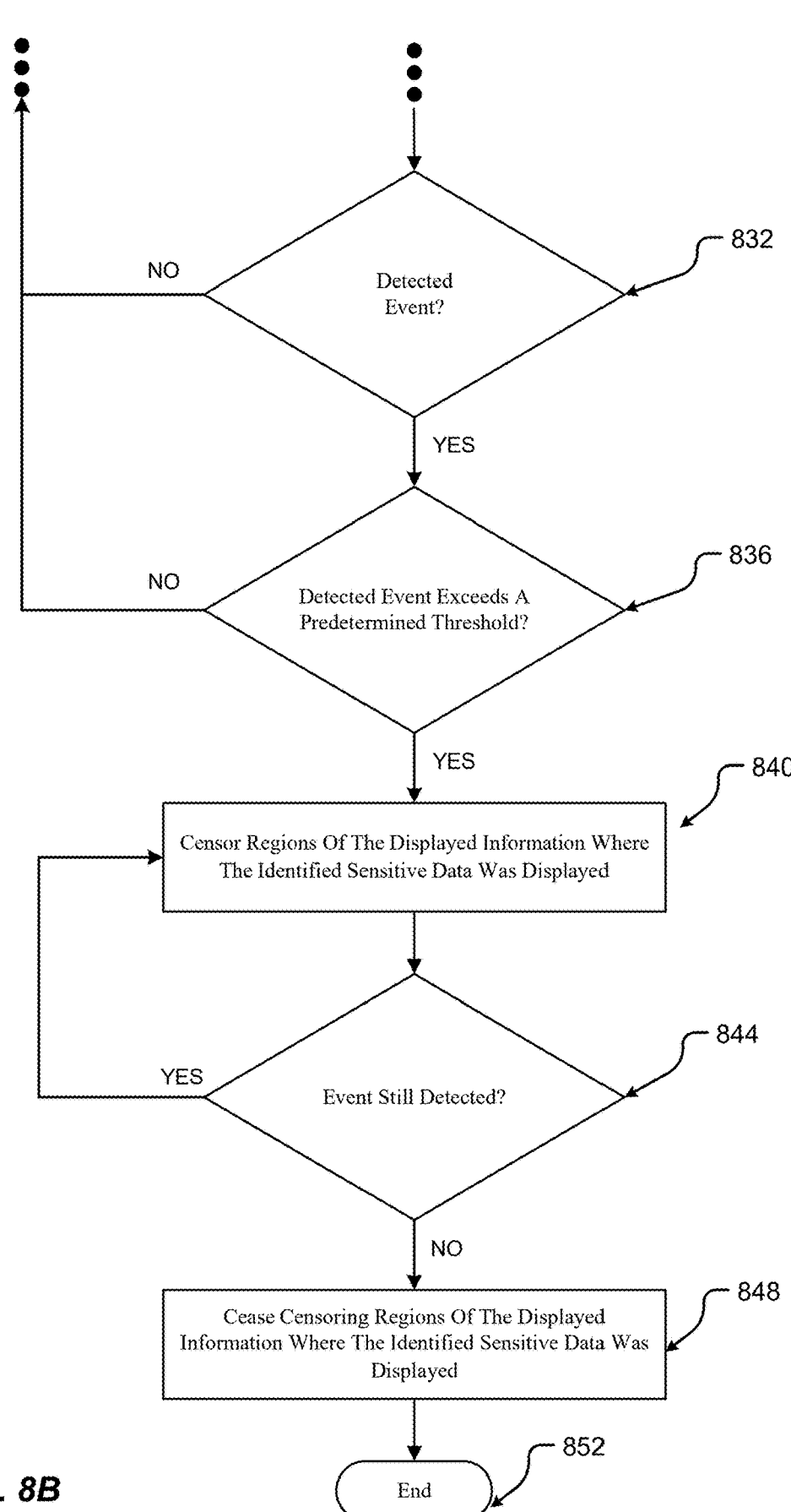

FIGS. 8A and 8B represent a flow diagram depicting method 800 for automatically censoring sensitive data in accordance with embodiments of the present disclosure.

While a general order of the steps of method 800 is shown in FIGS. 8A and 8B, method 800 can include more or fewer steps or can arrange the order of the step differently than those shown in FIGS. 8A and 8B. Further, two or more steps may be combined in one step. Generally, method 800 starts at a START operation at step 804 and ends with an END operation at step 852. Method 800 can be executed as a set of computer-executable instructions executed by a computer system (e.g., the one or more computing device(s) 104, the one or more server(s) 112, the processor 204, etc.) and encoded or stored on a computer readable medium (e.g., memory 208, etc.). Hereinafter, method 800 shall be explained with reference to the systems, components, modules, applications, software, data structures, user interfaces, etc. described in conjunction with FIGS. 1-6.

As illustrated in FIG. 8A, method 800 begins at the START operation at step 804 and proceeds to step 808, where the processor 204 of the one or more computing device(s) 104 or the one or more server(s) 112 receives information that is to be displayed on a display of a computing device.

After the processor 204 of the one or more computing device(s) 104 or the one or more server(s) 112 receives information that is to be displayed on a display of a computing device at step 808, method 800 proceeds to step 812, where the processor 204 of the one or more computing device(s) 104 or the one or more server(s) 112 analyzes the received information based on user security parameters. According to embodiments of the present disclosure, the user security parameters may include, for example, identified location parameters (e.g., home, office, private, public, semi-private, semi-public etc.), personal information parameters (e.g., name, telephone number, personal email address, date of birth, social security number, banking details, height, weight, place of birth, home address, work address, marital status, verification information, one time passwords, pin numbers, etc.), work information parameters (e.g., security codes, salary, business email address, project information, software details, updates to software or project information, PDF views, programming applications, chat applications, Word documents, etc.).

After the processor 204 of the one or more computing device(s) 104 or the one or more server(s) 112 analyzes the received information based on the user security parameters at step 812, method 800 proceeds to step 816, where the processor 204 of the one or more computing device(s) 104 or the one or more server(s) 112 identifies sensitive data and non-sensitive data from the received information based on the user security parameters.

After the processor 204 of the one or more computing device(s) 104 or the one or more server(s) 112 identifies sensitive data and non-sensitive data from the received information based on the user security parameters at step 816, method 800 proceeds to step 820, where the processor 204 of the one or more computing device(s) 104 or the one or more server(s) 112 displays the received information on the display of the computing device.

After the processor 204 of the one or more computing device(s) 104 or the one or more server(s) 112 displays the received information on the display of the computing device at step 820, method 800 proceeds to step 824, where the processor 204 of the one or more computing device(s) 104 or the one or more server(s) 112 obtains image data depicting a monitored environment in proximity to the display of the computing device.

After the processor 204 of the one or more computing device(s) 104 or the one or more server(s) 112 obtains image data depicting a monitored environment in proximity to the display of the computing device at step 824, method 800 proceeds to step 828 where the processor 204 of the one or more computing device(s) 104 or the one or more server(s) 112 analyzes the image data to identify a detected event in the monitored environment.

After the processor 204 of the one or more computing device(s) 104 or the one or more server(s) 112 analyzes the image data to identify a detected event in the monitored environment at step 828, method 800 proceeds to decision step 832 as illustrated in FIG. 8B, where the processor 204 of the one or more computing device(s) 104 or the one or more server(s) 112 determines if there is a detected event. If the processor 204 of the one or more computing device(s) 104 or the one or more server(s) 112 determines that there is a detected event (YES) at decision step 832, method 800 proceeds to decision step 836, where the processor 204 of the one or more computing device(s) 104 or the one or more server(s) 112 determines if the detected event exceeds a predetermined threshold. If the processor 204 of the one or more computing device(s) 104 or the one or more server(s) 112 determines that the detected event exceeds the predetermined threshold (YES) at decision step 836, method 800 proceeds to step 840, where the processor 204 of the one or more computing device(s) 104 or the one or more server(s) 112 censors regions of the displayed information where the identified sensitive data was displayed.

After the processor 204 of the one or more computing device(s) 104 or the one or more server(s) 112 censors regions of the displayed information where the identified sensitive data was displayed at step 840, method 800 proceeds to decision step 844 where the processor 204 of the one or more computing device(s) 104 or the one or more server(s) 112 determines if an event is still being detected. If the processor 204 of the one or more computing device(s) 104 or the one or more server(s) 112 determines that an event is still being detected (YES) at decision step 844, method 800 returns to step 840 where the processor 204 of the one or more computing device(s) 104 or the one or more server(s) 112 continues to censor regions of the displayed information where the identified sensitive data was displayed. If the processor 204 of the one or more computing device(s) 104 or the one or more server(s) 112 determines that an event is not still being detected (NO) at decision step 844, method 800 proceeds to step 848, where the processor 204 of the one or more computing device(s) 104 or the one or more server(s) 112 ceases censoring regions of the displayed information where the identified sensitive data was displayed.

After the processor 204 of the one or more computing device(s) 104 or the one or more server(s) 112 ceases censoring regions of the displayed information where the identified sensitive data was displayed at step 848, method 800 ends with the END operation at step 852. If the processor 204 of the one or more computing device(s) 104 or the one or more server(s) 112 determines that there is no detected event (NO) at decision step 832 or if the processor 204 of the one or more computing device(s) 104 or the one or more server(s) 112 determines that the detected event does not exceed the predetermined threshold (NO) at decision step 836, method 800 returns to step 828 where the processor 204 of the one or more computing device(s) 104 or the one or more server(s) 112 analyzes the image data to identify a detected event in the monitored environment.

Any of the steps, functions, and operations discussed herein can be performed continuously and automatically.

The exemplary systems and methods of this disclosure have been described in relation to communication devices, multiple-device access environments, and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., conferencing servers, client devices, etc.), it should be appreciated that the components, systems, and/or methods described herein may be employed as part of a peer-to-peer network or other network. As can be appreciated, in a peer-to-peer network, the various components or systems described in conjunction with the communication system 100 may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for automatically censoring sensitive data, the method comprising:
   receiving, by a processor, information that is to be displayed on a display of a computing device;
   analyzing, by the processor, the received information based on user security parameters;
   identifying, by the processor, sensitive data and non-sensitive data from the received information based on the user security parameters;
   displaying, by the processor, the received information on the display of the computing device;
   obtaining, by the processor, image data depicting a monitored environment in proximity to the display of the computing device;
   analyzing, by the processor, the image data to identify a detected event in the monitored environment, wherein the detected event is an event from a group of events comprising:
      at least one object in the monitored environment,
      a change in a first image of the monitored environment from a second image of the monitored environment, and
      a change in distance of the identified at least one object to the computing device in the monitored environment; and
   when the detected event in the monitored environment exceeds a predetermined threshold, censoring, by the processor, regions of the displaying received information where the identified sensitive data was displayed and alerting a user of the computing device.

2. The method of claim 1, wherein the user security parameters include preselected information by the user identifying sensitive data from the information that is to be displayed on the display of the computing device.

3. The method of claim 1, wherein censoring, by the processor, regions of the received information where the identified sensitive data is displayed includes displaying a graphical region over the identified sensitive data.

4. The method of claim 1, wherein censoring, by the processor, regions of the received information where the identified sensitive data is displayed includes reducing visibility of portions of the display where the identified sensitive information is displayed.

5. The method of claim 1, wherein censoring, by the processor, regions of the received information where the identified sensitive data is displayed includes reducing, by the processor, visibility of portions of the display where the identified sensitive information is displayed based on the change in distance of the identified at least one object to the computing device.

6. The method of claim 1, wherein alerting, by the processor, the user of the computing device when the detected event exceeds the predetermined threshold includes displaying, by the processor, a notification message on the display of the computing device to alert the user.

7. The method of claim 1, wherein alerting, by the processor, the user of the computing device when the detected event exceeds the predetermined threshold includes displaying, by the processor, an image of the monitored environment at a time of the detected event on the display of the computing device to alert the user.

8. The method of claim 1, further comprising removing, by the processor, the censoring of the regions of the received information where the identified sensitive data is displayed when the detected event in the monitored environment no longer exceeds the predetermined threshold such that identified sensitive information is displayed.

9. The method of claim 1, wherein obtaining, by the processor, the image data depicting the monitored environment in proximity to the display of the computing device includes recognizing, by the processor, at least one face from the image data; and
   wherein analyzing, by the processor, the image data to identify the detected event in the monitored environment includes determining, by the processor, the at least one recognized face from the image data does not match an authorized facial image.

10. The method of claim 1, wherein obtaining, by the processor, image data depicting the monitored environment in proximity to the display of the computing device includes recognizing, by the processor, a background environment from the image data;
   wherein analyzing, by the processor, the image data to identify the detected event in the monitored environment includes, determining, by the processor, the recognized background environment does not match a preset background environment.

11. A computer system, comprising:
   a processor; and
   a computer-readable storage medium storing computer-readable instructions, which when executed by the processor, cause the processor to:
      receive information that is to be displayed on a display of a computing device;

analyze the received information based on user security parameters;

identify sensitive data and non-sensitive data from the received information based on the user security parameters;

display the received information on the display of the computing device;

obtain image data depicting a monitored environment in proximity to the display of the computing device;

analyze the image data to identify a detected event in the monitored environment, wherein the detected event is an event from a group of events comprising:

at least one object in the monitored environment, a change in a first image of the monitored environment from a second image of the monitored environment, and a change in distance of the identified at least one object to the computing device in the monitored environment; and when the detected event in the monitored environment exceeds a predetermined threshold, censor regions of the displaying received information where the identified sensitive data was displayed and alert a user of the computing device.

12. The computer system of claim 11, wherein the user security parameters include preselected information by the user identifying sensitive data from the information that is to be displayed on the display of the computing device.

13. The computer system of claim 11, wherein censor regions of the received information where the identified sensitive data is displayed includes displaying a graphical region over the identified sensitive data.

14. The computer system of claim 11, wherein censor regions of the received information where the identified sensitive data is displayed includes reducing visibility of portions of the display where the identified sensitive information is displayed.

15. The computer system of claim 11, wherein censor regions of the received information where the identified sensitive data is displayed includes reducing visibility of portions of the display where the identified sensitive information is displayed based on the change in distance of the identified at least one object to the computing device.

16. A computer program product comprising:

a computer-readable storage medium having computer-readable program code embodied therewith, the computer-readable program code configured, when executed by a processor, to:

receive information that is to be displayed on a display of a computing device;

analyze the received information based on user security parameters;

identify sensitive data and non-sensitive data from the received information based on the user security parameters;

display the received information on the display of the computing device;

obtain image data depicting a monitored environment in proximity to the display of the computing device;

analyze the image data to identify a detected event in the monitored environment, wherein the detected event is one of a group of events comprising:

at least one object in the monitored environment, a change in a first image of the monitored environment from a second image of the monitored environment, and a change in distance of the identified at least one object to the computing device in the monitored environment; and when the detected event in the monitored environment exceeds a predetermined threshold, censor regions of the displaying received information where the identified sensitive data was displayed and alert a user of the computing device.

* * * * *